(12) United States Patent
Shin et al.

(10) Patent No.: US 9,277,159 B2
(45) Date of Patent: Mar. 1, 2016

(54) DISPLAY APPARATUS, AND REMOTE CONTROL APPARATUS FOR CONTROLLING THE SAME AND CONTROLLING METHODS THEREOF

(71) Applicant: SAMSUNG ELECTRONICS CO., LTD., Suwon-si (KR)

(72) Inventors: Sun-hwa Shin, Suwon-si (KR); Chang-seog Ko, Hwaseong-si (KR); Bong-ki Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/283,490

(22) Filed: May 21, 2014

(65) Prior Publication Data

US 2014/0253816 A1  Sep. 11, 2014

Related U.S. Application Data

(63) Continuation-in-part of application No. 13/729,878, filed on Dec. 28, 2012.

(30) Foreign Application Priority Data

| Dec. 29, 2011 | (KR) | 10-2011-0146163 |
| Dec. 29, 2011 | (KR) | 10-2011-0146195 |
| Dec. 29, 2011 | (KR) | 10-2011-0146197 |
| Apr. 20, 2012 | (KR) | 10-2012-0041465 |
| Oct. 12, 2012 | (KR) | 10-2012-0113835 |

(51) Int. Cl.
*H04N 5/50* (2006.01)
*H04N 5/04* (2006.01)
(Continued)

(52) U.S. Cl.
CPC ......... *H04N 5/4403* (2013.01); *H04N 13/0438* (2013.01); *H04N 21/4122* (2013.01);
(Continued)

(58) Field of Classification Search
CPC ................... H04N 5/4403; H04N 2005/4405
USPC ........................................................ 348/55
See application file for complete search history.

(56) References Cited

U.S. PATENT DOCUMENTS 5,781,247 A * 7/1998 Wehmeyer et al. ........... 348/569
8,803,954 B2    8/2014 Banavara
(Continued)

FOREIGN PATENT DOCUMENTS

CN    102237075 A    11/2011
CN    102256144 A    11/2011
(Continued)

OTHER PUBLICATIONS

Communication, Issued by the Japanese Patent Office, Dated Aug. 19, 2014, in counterpart Japanese Application No. 2012-288480.
(Continued)

*Primary Examiner* — Hee-Yong Kim
(74) *Attorney, Agent, or Firm* — Sughrue Mion, PLLC

(57) ABSTRACT

A display apparatus and a display method are provided. The display apparatus includes: a receiver configured to receive a plurality of contents; a signal processor configured to obtain image frames by processing the received plurality of contents; a display configured to output a plurality of content views including a first content view and a second content view by sequentially outputting the obtained image frames; a remote control signal receiver configured to receive a control command from a remote control apparatus; and a controller configured to, when the received control command is to control the first content view, determine whether the received control command is a control command that has an influence on the second content view.

42 Claims, 26 Drawing Sheets

(51) Int. Cl.
*H04N 5/44* (2011.01)
*H04N 21/41* (2011.01)
*H04N 21/422* (2011.01)
*H04N 21/43* (2011.01)
*H04N 21/4363* (2011.01)
*H04N 21/4402* (2011.01)
*H04N 21/488* (2011.01)
*H04N 21/81* (2011.01)
*H04N 13/04* (2006.01)

(52) U.S. Cl.
CPC ... *H04N21/42221* (2013.01); *H04N 21/42222* (2013.01); *H04N 21/4307* (2013.01); *H04N 21/43637* (2013.01); *H04N 21/440281* (2013.01); *H04N 21/4882* (2013.01); *H04N 21/816* (2013.01); *H04N 13/0434* (2013.01); *H04N 13/0436* (2013.01); *H04N 2005/4405* (2013.01); *H04N 2013/0463* (2013.01)

(56) References Cited

U.S. PATENT DOCUMENTS

| | | | |
|---|---|---|---|
| 8,982,194 | B2 | 3/2015 | Mori et al. |
| 2004/0257337 | A1 | 12/2004 | Shibamiya et al. |
| 2009/0322582 | A1 | 12/2009 | Baugh et al. |
| 2011/0102561 | A1 | 5/2011 | Ichihashi |
| 2011/0159929 | A1 | 6/2011 | Karaoguz et al. |
| 2011/0254934 | A1 | 10/2011 | Yoon et al. |
| 2011/0285829 | A1 | 11/2011 | Mori et al. |
| 2011/0285905 | A1 | 11/2011 | Muikaichi et al. |
| 2011/0316987 | A1* | 12/2011 | Komoriya et al. .............. 348/51 |
| 2012/0026396 | A1 | 2/2012 | Banavara |
| 2013/0100261 | A1 | 4/2013 | Kwak et al. |

FOREIGN PATENT DOCUMENTS

| | | | |
|---|---|---|---|
| EP | 2378785 | A2 | 10/2011 |
| EP | 2385706 | A1 | 11/2011 |
| JP | 2008-116792 | A | 5/2008 |
| JP | 2009164977 | A | 7/2009 |
| JP | 2011-118351 | A | 6/2011 |
| KR | 1020110082380 | A | 7/2011 |
| KR | 1020110086415 | A | 7/2011 |
| KR | 1020110115806 | A | 10/2011 |
| WO | 2011099780 | A2 | 8/2011 |

OTHER PUBLICATIONS

Communication, Issued by the Australian Patent Office, Dated Sep. 17, 2014, in counterpart Australian Application No. 2012275035.

Communication, Issued by the European Patent Office, Dated Oct. 24, 2014, in counterpart European Application No. 12197592.4.

Communication dated Dec. 4, 2014, issued by the Australian Intellectual Property Office in counterpart Australian Application No. 2012275035.

Communication, dated Feb. 19, 2013, issued by the Korean Patent Office in counterpart Korean Application No. 10-2012-0113835.

Communication, dated Mar. 19, 2013, issued by the European Patent Office in counterpart European Application No. 12197592.4.

International Search Report (PCT/ISA/210), dated Mar. 27, 2013, issued by the International Patent Office in counterpart International Application No. PCT/KR2012/010781.

Written Opinion (PCT/ISA/237), dated Mar. 27, 2013, issued by the International Patent Office in counterpart International Application No. PCT/KR2012/010781.

Examination Report issued on Nov. 22, 2013 by the Australian Patent Office for Australian Patent Application No. 2012275035.

Office Action dated Jun. 3, 2015, issued by the State Intellectual Property Office of People's Republic of China in counterpart Chinese Patent Application No. 201210590116.6.

Communication dated Dec. 22, 2015, issued by the Japanese Patent Office in counterpart Japanese Application No. 2012-288480.

* cited by examiner

FIG. 21
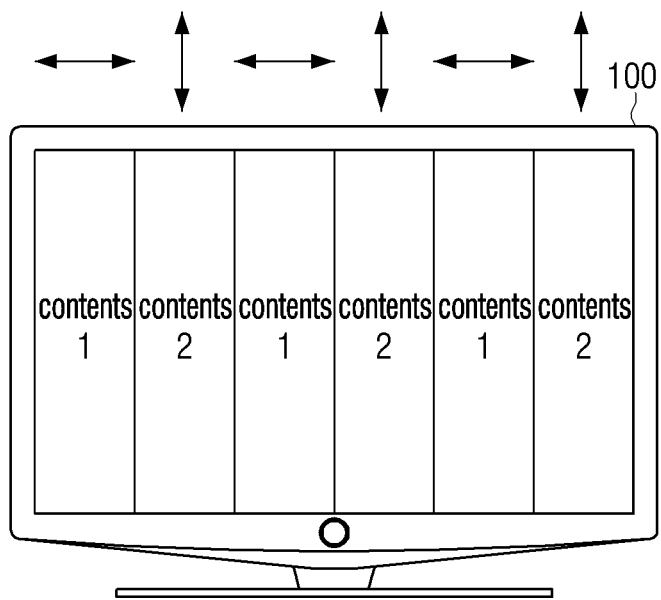
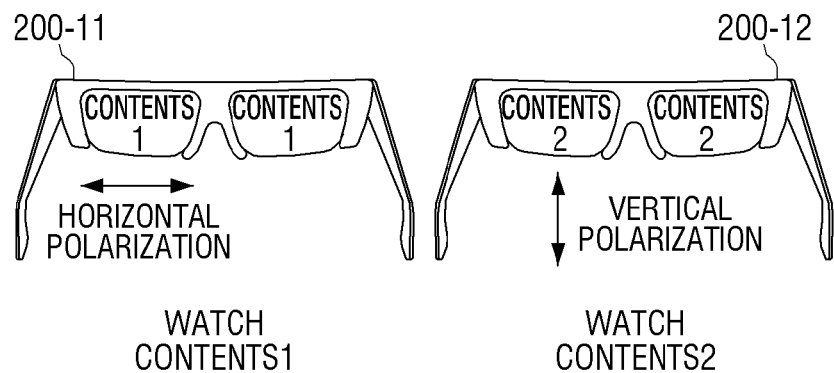

DISPLAY APPARATUS, AND REMOTE CONTROL APPARATUS FOR CONTROLLING THE SAME AND CONTROLLING METHODS THEREOF

CROSS-REFERENCE TO RELATED APPLICATIONS

This application is a continuation-in-part of U.S. application Ser. No. 13/729,878, filed Dec. 28, 2012, which claims priority from Korean Patent Application No. 10-2011-0146195, filed Dec. 29, 2011 in the Korean Intellectual Property Office, Korean Patent Application No. 10-2011-0146197, filed Dec. 29, 2011 in the Korean Intellectual Property Office, Korean Patent Application No. 10-2011-0146163, filed Dec. 29, 2011 in the Korean Intellectual Property Office, and Korean Patent Application No. 10-2012-0041465, filed Apr. 20, 2012 in the Korean Intellectual Property Office, and Korean Patent Application No. 10-2012-0113835, filed Oct. 12, 2012 in the Korean Intellectual Property Office, the entire disclosures of which are incorporated herein by reference.

BACKGROUND

1. Field

Apparatuses and methods consistent with exemplary embodiments relate to a display apparatus, a remote control apparatus for controlling the display apparatus, and controlling methods thereof. More particularly, apparatuses and methods consistent with exemplary embodiments relate to a display apparatus for providing different contents to a plurality of users, a remote control apparatus for controlling the display apparatus, and controlling methods thereof.

2. Description of the Related Art

In accordance with the advance of digital technologies, various electronic products have been developed and supplied. Particularly, display devices such as televisions (TVs), mobile phones, personal computers (PCs), notebook PCs, tablet devices, smart devices, personal digital assistants (PDAs), etc., are widely used in many households.

As the use of display devices is increasing, user needs for more various operations also increase. Hence, manufacturers have exerted more efforts to meet those user needs and release products with totally new operations such as three-dimensional (3D) content provision.

Recently, efforts have been made to develop a display apparatus for providing a plurality of contents at the same time so that a plurality of users can watch different contents. Using such a display apparatus with this operation, users who are not familiar with manipulations for controlling this display apparatus cannot know a current situation and a manipulation for a particular situation.

When the plurality of the users views the plurality of the contents, a control command applied to each content and a common control command can exist. When the users are not aware of the respective commands, the control command of a certain user can interrupt the content view of another user.

Hence, there is a need to obtain the status and the operating method of the display apparatus easily and intuitively.

Also, there is a need for a method for controlling the contents viewed by the plurality of the users using a single remote control apparatus.

SUMMARY

According to an aspect of an exemplary embodiment, there is provided a display apparatus, including: a receiver configured to receive a plurality of contents; a signal processor configured to obtain image frames by processing the received plurality of contents; a display configured to output a plurality of content views including a first content view and a second content view by sequentially outputting the obtained image frames; a remote control signal receiver configured to receive a control command from a remote control apparatus; and a controller configured to, when the received control command is to control the first content view, determine whether the received control command is a control command that has an influence on the second content view.

The controller may, when the received control command is the control command that has the influence on the second content view, control to output a message in response to the received control command on at least one of the first content view and the second content view.

The controller may, when the received control command is the control command that has the influence on the second content view, control to display, on the first content view, a message notifying that the control command is not executable.

The controller may, when the received control command is a control command that has no influence on the second content view, execute the received control command.

The controller may, when the received control command is the control command that has the influence on the second content view, control to display, on the second content view, a message requesting acceptance of an execution of the received control command, and when a signal accepting the execution of the received control command is received, execute the received control command.

The message may be at least one of a message notifying an input of the received control command, a message requesting acceptance of an execution of the received control command, and a message notifying that the received control command is not executable.

The message may be output as at least one of an on-screen display (OSD) type, a pop-up type, an icon type, a ticker type, a sound type, and a vibration type.

Whether to receive the message in response to the received control command may be selectable on the second content view.

The controller may assign priority to at least one of the first content view and the second content view.

The controller may assign a highest priority to a content view corresponding to a glasses apparatus paired first.

The controller may determine a priority of a content view corresponding to a user based on an account information of the user.

The controller may assign a priority to a content view according to a preset glasses apparatus.

The controller may, when the received control command is the control command that has the influence on the second content view, and the second content view has a higher priority than the first content view, control to display, on the second content view, a message requesting acceptance of an execution of the received control command.

The controller may, when a signal accepting the execution of the received control command execution is received, execute the received control command.

The controller may, when the received control command is the control command that has the influence on the second content view, and the first content view has a higher priority than the second content view, control to display, on the second content view, a message notifying an input of the received control command.

The controller may, when the received control command is the control command that has the influence on the second content view, and the second content view has a higher priority than the first content view, control to display, on the first content view, a message notifying that the received control command is not executable.

According to an aspect of another exemplary embodiment, there is provided a display apparatus, including: a receiver configured to receive a plurality of contents; a signal processor configured to obtain image frames by processing the received plurality of contents; a display configured to output a plurality of content views including a first content view and a second content view by sequentially outputting the obtained image frames; a remote control signal receiver configured to receive a control command from a remote control apparatus; and a controller configured to output via the display a first control command list on the first content view and a second control command list on the second content view.

The controller may control to separately display the first control command list and the second control command list.

The second control command list may be a list of control commands that have no influence on the first content view.

The second control command list may be a list in which a control command that has an influence on the first content view is inactivated.

The at least one of the first control command list and the second control command list may settable by a user of the first content view.

According to an aspect of another exemplary embodiment, there is provided a display method, including: receiving a plurality of contents; obtaining image frames by processing the received plurality of contents; outputting a plurality of content views including a first content view and a second content view by sequentially outputting the obtained image frames; receiving a control command from a remote control apparatus; and when the received control command is to control the first content view, determining whether the received control command is a control command that has an influence on the second content view.

The method may further include, when the received control command is the control command that has the influence on the second content view, outputting a message in response to the received control command at least one of the first content view and the second content view.

The method may further include, when the received control command is the control command that has the influence on the second view, displaying, on the first content view, a message notifying that the control command is not executable.

The method may further include, when the received control command is a control command that has no influence on the second content view, executing the received control command.

The method may further include, when the received control command is the control command that has the influence on the second content view, displaying, on the second content view, a message requesting acceptance of an execution of the received control command, and when a signal accepting the execution of the received control command is received, executing the received control command.

The message may be at least one of a message notifying an input of the received control command, a message requesting acceptance of an execution of the received control command, and a message notifying that the received control command is not executable.

The message may be output as at least one of an OSD type, a pop-up type, an icon type, a ticker type, a sound type, and a vibration type.

Whether to receive the message in response to the received control command may be selectable on the second content view.

The method may further include assigning priority on at least one of the first content view and the second content view.

The assigning the priority may include assigning a highest priority on a content view corresponding to a glasses apparatus paired first.

The assigning the priority may include determining a priority of a content view corresponding to a user based on an account information of the user.

The assigning the priority may include assigning a priority on a content view according to a preset glasses apparatus.

The method may further include, when the received control command is the control command that has the influence on the second content view, and the second content view has a higher priority than the first content view, displaying, on the second content view, a message requesting acceptance of an execution of the received control command.

The method may further include, when a signal accepting the execution of the received control command execution is received, executing the received control command.

The method may further include, when the received control command is the control command that has the influence on the second content view, and the first content view has a higher priority than the second content view, displaying, on the second content view, a message notifying an input of the received control command.

The method may further include, when the received control command is the control command that has the influence on the second content view, and the second content view has a higher priority than the first content view, displaying, on the first content view, a message notifying that the received control command is not executable.

According to an aspect of another exemplary embodiment, there is provided a display method, including: receiving a plurality of contents; obtaining image frames by processing the received plurality of contents; outputting a plurality of content views including a first content view and a second content view by sequentially outputting the obtained image frames; receiving a control command from a remote control apparatus; and outputting a first control command list on the first content view and a second control command list on the second content view.

The first control command list and the second control command list may be separately displayed.

The second control command list may be a list of control commands that have no influence on the first content view.

The second control command list may be a list in which a control command that has an influence on the first content view is inactivated.

At least one of the first control command list and the second control command list may be settable by a user of the first content view.

BRIEF DESCRIPTION OF THE DRAWINGS

These and/or other aspects and advantages will become apparent and more readily appreciated from the following description of exemplary embodiments, taken in conjunction with the accompanying drawings of which:

FIG. 21 is a view of a case where contents are being watched through a glasses apparatus having a polarizing lens according to a pattern retarder method, according to an exemplary embodiment;

DETAILED DESCRIPTION OF EXEMPLARY EMBODIMENTS

Figure 1:
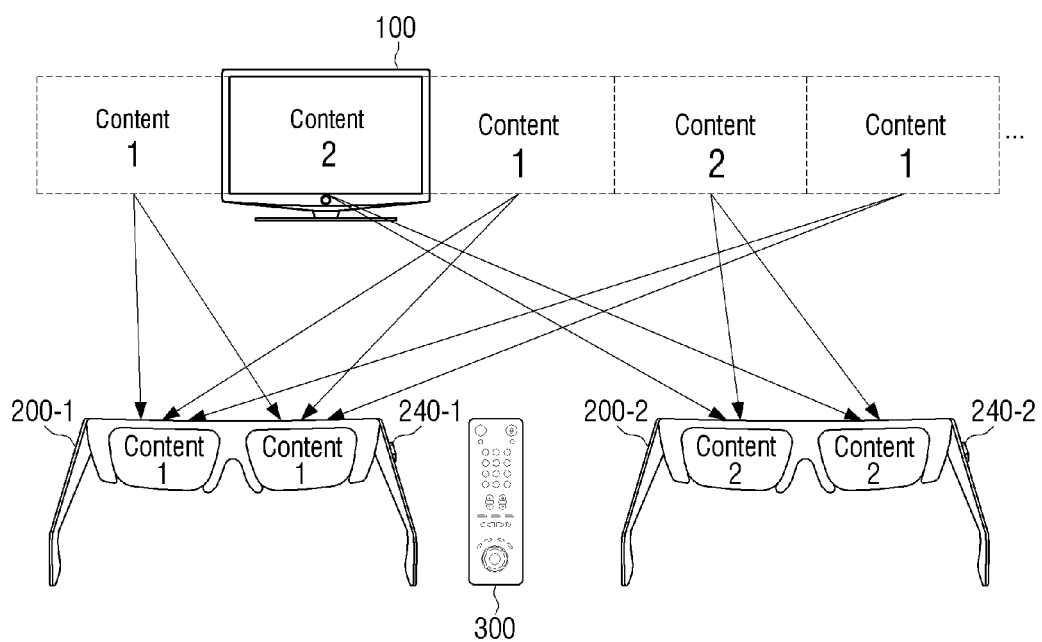
FIG. 1 is a diagram of a display system according to an exemplary embodiment.

Reference will now be made in detail to exemplary embodiments, examples of which are illustrated in the accompanying drawings, wherein like reference numerals refer to the like elements throughout. Exemplary embodiments are described below with reference to the figures.

FIG. 1 is a diagram of a display system according to an exemplary embodiment.

The display system of FIG. 1 includes a display apparatus 100, glasses apparatuses 200, and a remote control apparatus 300.

The display apparatus 100 receives and alternately displays a plurality of contents through a plurality of content views.

The display apparatus 100 generates synchronization signals corresponding to the respective content views and sends one of the generated synchronization signals to each of the glasses apparatuses 200.

The glasses apparatus 200 receives the synchronization signal from the display apparatus 100 and opens shutter glasses according to the received synchronization signal. Hence, a viewer wearing the glasses apparatus 200 can watch a particular content, among the plurality of the contents, displayed in the content view synchronized (mapped) with the glasses apparatus 200.

The remote control apparatus 300 receives and sends, to the display apparatus 100, a user command for controlling the display apparatus 100. The remote control apparatus 300 detects the closest one of the glasses apparatuses 200-1 and 200-2, and sends a control command to control the content view synchronized with the corresponding glasses apparatus 200-1 or 200-2.

Herein, when image frames of the contents are alternately arranged and displayed, the content view indicates a set of image frames of one content viewable by the user wearing the glasses apparatus 200. However, the content view is different from the content. For example, when the viewer wearing the glasses apparatus 200 synchronized with a particular content view changes a TV channel while watching a content A or watches a content C by playing other DVD content, the content is changed from A to C but the content view is not changed. That is, the content view is a super ordinate concept of the content and similar to a channel for the content view.

As shown in FIG. 1, the display apparatus 100 alternately displays first content and second content through the plurality of the content views. The first glasses apparatus 200-1 receives the synchronization signal corresponding to the first content view and opens the shutter glasses when the first content is displayed, and the viewer wearing the first glasses apparatus 200-1 can watch the first content. The second glasses apparatus 200-2 receives the synchronization signal corresponding to the second content view and opens the shutter glasses when the second content is displayed, and the viewer wearing the second glasses apparatus 200-2 can watch the second content.

While the display apparatus 100 of FIG. 1 displays two contents and is connected with two glasses apparatuses 200-1 and 200-2 corresponding to the two content views, it is understood that one or more other exemplary embodiments are not limited thereto. For example, according to one or more other exemplary embodiments, the display apparatus 100 can display three or more contents through three or more content views and be connected with three or more glasses apparatuses.

The display apparatus 100 can communicate with the glasses apparatus 200 and the remote control apparatus 300 using various wireless communication technologies such as Wi-Fi, Bluetooth, Infrared Data Association (IRDA), Radio Frequency (RF), IEEE 802.11, WLAN, HR WPAN, UWB, LR WPAN, and IEEE 1394.

Figure 2:
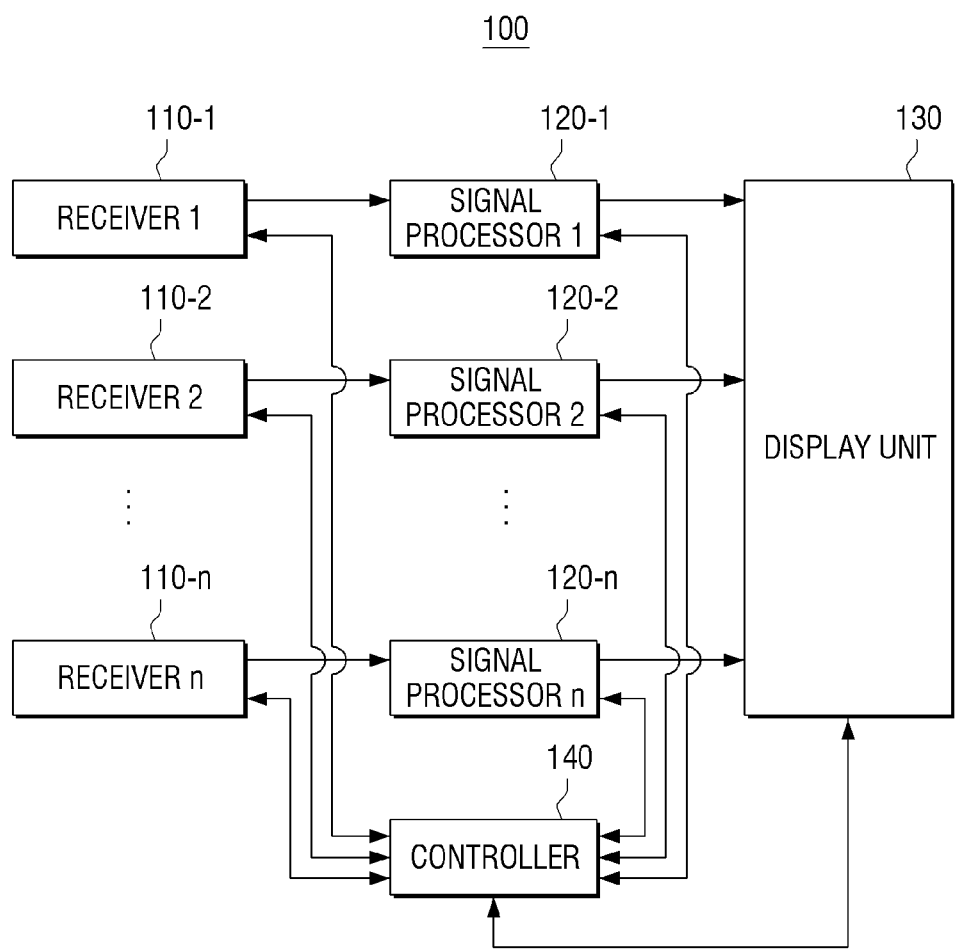
FIG. 2 is a block diagram of a display apparatus according to an exemplary embodiment.

FIG. 2 is a block diagram of a display apparatus 100 according to an exemplary embodiment.

Referring to FIG. 2, the display apparatus 100 includes at least one receiver (e.g., a plurality of receivers 110-1 through 110-n), a plurality of signal processors 120-1 through 120-n, a display unit 130 (e.g., display), and a controller 140. The display apparatus 100 can be implemented using various devices including a display unit, such as TV, mobile phone, PDA, notebook PC, monitor, tablet PC, e-book, digital frame, kiosk, smart device, etc.

The at least one receiver (e.g., plurality of receivers 110-1 through 110-n) receives a plurality of different contents. For example, the plurality of receivers 110-1 through 110-n each receive a broadcasting program content from a broadcasting station using a broadcasting network, or receive a content file from a web server using Internet. The receivers 110-1 through 110-n may receive the contents from various recording medium players which are embedded in or connected to the display apparatus 100. The recording medium player indicates a device which reproduces the contents stored in various recording media such as CDs, DVDs, hard disc, Blu-ray discs, memory cards, USB memory, etc.

When the content is received from the broadcasting station, the receivers 110-1 through 110-n can include a tuner, a demodulator, and an equalizer. By contrast, when the content is received from a source such as web server, the receivers 110-1 through 110-n can be realized as a network interface card. When the contents are received from various recording medium players, the receivers 110-1 through 110-n can be realized as an interface unit connected to the recording medium player. As such, the receivers 110-1 through 110-n can be implemented in various fashions.

Furthermore, it is understood that the receivers 110-1 through 110-n do not necessarily receive the contents from sources of the same type, and may receive the contents from sources of different types. For example, the first receiver 110-1 may include a tuner, a demodulator, and an equalizer, and the second receiver 110-2 may include a network interface card.

Meanwhile, in FIG. 2, the display apparatus 100 includes a plurality of receivers 110-1 through 110-n, but a plurality of receivers may be realized as a single receiver depending on exemplary embodiments. That is, a single receiver may receive a plurality of contents.

The signal processors 120-1 through 120-n can generate image frames by processing the contents received by the receivers 110-1 through 110-n. The signal processor 120 is explained in more detail by referring to FIG. 3.

Figure 3:
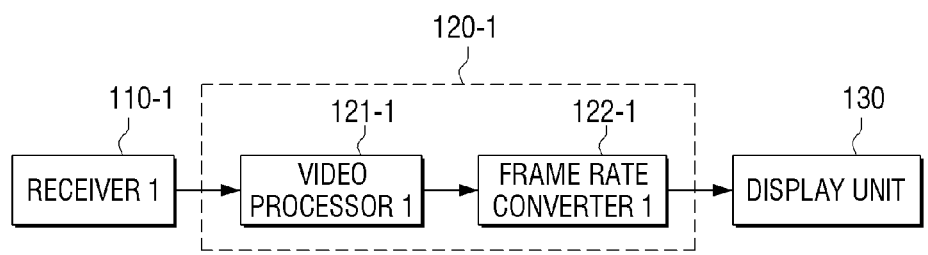
FIG. 3 is a block diagram of a signal processor according to an exemplary embodiment.

FIG. 3 is a block diagram of a signal processor 120 according to an exemplary embodiment.

As shown in FIG. 3, the first signal processor 120-1 includes a first video processor 121-1 and a frame rate converter 122-1. While the first signal processor 120-1 alone is shown in FIG. 3, the same or similar structure of FIG. 3 can be applied to the other signal processors 120-2 through 120-n.

The first video processor 121-1 processes video data in the content received from the first receiver 110-1. In detail, the first video processor 121-1 can include a decoder for decoding the video data, and a scaler for scaling up or down the video data according to a screen size of the display unit 130.

Furthermore, the first video processor 121-1 may convert the video data into a data format corresponding to the first frame rate converter 122-1. For example, when the input video data is in a top-to-bottom format and the first frame rate converter 122-1 processes the frame in a side-by-side format, the first video processor 121-1 can convert the image frames of the contents into the side-by-side format by arranging the image frames side-by-side in the horizontal direction.

The first frame rate converter 122-1 converts a frame rate of the content output from the first video processor 121-1 to an output rate of the display apparatus 100. For example, when the display apparatus 100 operates at 60 Hz in a single-view mode, the first frame rate converter 122-1 can convert the frame rate of each content to 60 Hz as in the frame rate of the single-view mode. As for n-ary (e.g., secondary when n=2) contents in a multi-view mode, the display apparatus 100 may operate at the output rate of n*60 Hz.

Meanwhile, in FIG. 2, the display apparatus 100 includes a plurality of signal processors 120-1 through 120-n, but a plurality of signal processors may be realized as a single signal processor depending on exemplary embodiments. That is, a single signal processor may process a plurality of contents.

The display unit 130 alternately arranges and displays the image frames of the contents generated by the signal processors 120-1 through 120-n. In detail, the display unit 130 multiplexes to alternately arrange and display the image frames of the contents output from the signal processors 120-1 through 120-n at least one-by-one. In some cases, the display unit 130 may scale up or down the image frame of the content according to the screen size.

For example, in the display apparatus of a shutter glasses type, the display unit 130 alternately arranges and displays the image frame of the first content, the image frame of the second content, . . . , and the image frame of the n-th content at least one-by-one. The user can watch his/her intended content by wearing the glasses apparatus 200 which interworks at the display timing of the content of the display unit 130. In detail, the glasses apparatus 200 includes a left-eye shutter glass and a right-eye shutter glass. The left-eye shutter glass and the right-eye shutter glass are alternately opened and closed in the 3D content view. By contrast, when at least one image frame is alternately arranged and displayed, the left-eye shutter glass and the right-eye shutter glass are opened and closed together according to the output timing of the content synchronized with the glass apparatus 200. Hence, the user can watch the content separately from other users.

As such, the mode for alternately arranging and outputting the image frames of the contents can be referred to as a multi-view mode (or a dual-view mode). In a normal mode (or a single-view mode) for displaying either the two-dimensional (2D) content or the 3D content, the display apparatus 100 can process the contents by activating only one of the receivers 110-1 through 110-n. When the user selects the multi-view mode in the normal mode, the display apparatus 100 can process the data by activating one or more other receivers 110-1 through 110-n.

Meanwhile, the content can be the 2D content or the 3D content. The 3D content allows the user to feel the depth using a plurality of images representing the same object from different point of views.

When the plurality of the 3D contents is used, the display unit 130 can multiplex the left-eye images and the right-eye images of the 3D contents provided from the plurality of frame rate converters 122-1 through 122-n based on a preset arrangement, and alternately arrange them with the image frames of the other content.

Hence, the left image and the right image of the first content, the left image and the right image of the second content, . . . , and the left image and the right image of the n-th content are sequentially arranged and displayed. The user perceives the left image and the right image of one content through the glasses apparatus 200.

The controller 140 controls the operations of the display apparatus 100. In detail, the controller 140 controls the receivers 110-1 through 110-n, the signal processors 120-1 through 120-n, and the display unit 130 to perform their corresponding operations.

When a predefined event occurs, the controller 140 can control the signal processors 120-1 through 120-n and the display unit 130 to operate according to the event.

Herein, the predefined event can include an event for receiving a control command to control one of the content views from the remote control apparatus 300, an event not synchronizing at least one of the contents with the glasses apparatus 200, an event for inputting a multi-view mode start command, an event for inputting a control authority request command from the remote control apparatus 300, an event for inputting a multi-view mode end command, etc.

The detailed operations of the controller 140 according to the predefined event will be explained below.

Figure 4:
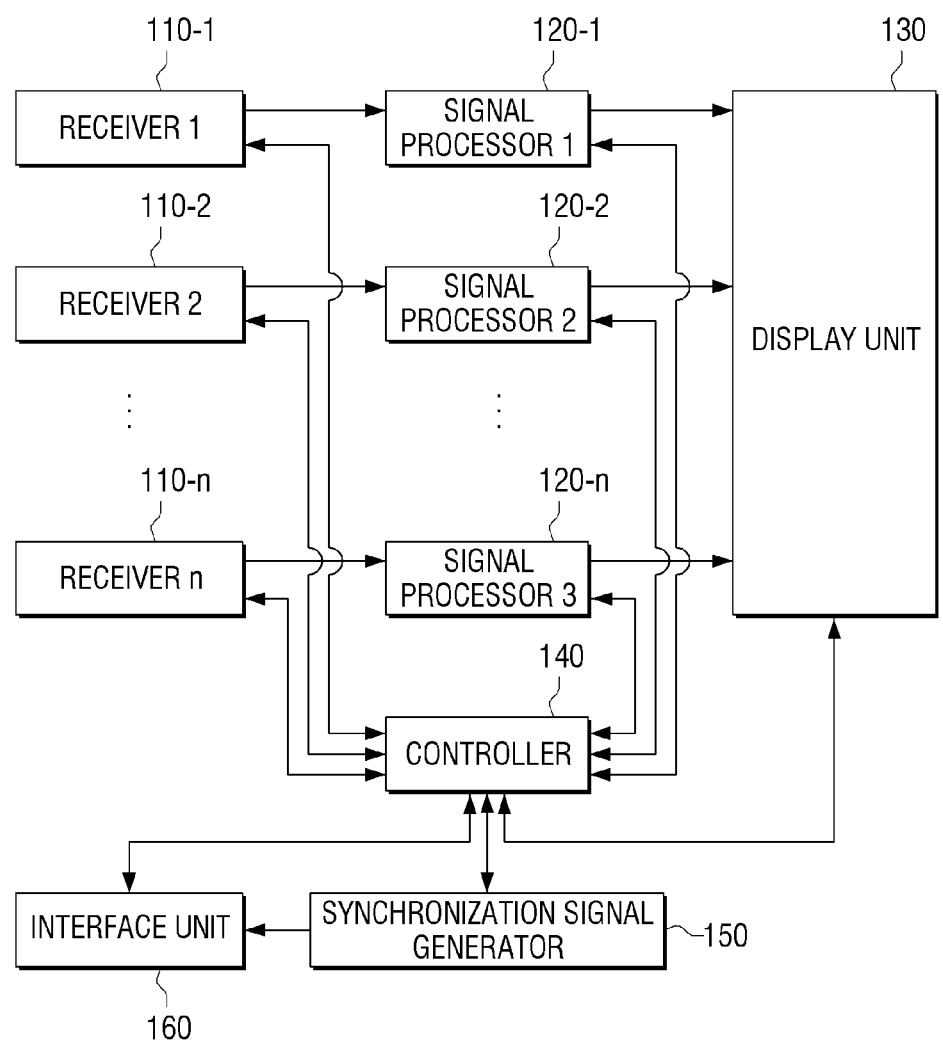
FIG. 4 is a block diagram of a display apparatus according to another exemplary embodiment.

FIG. 4 is a block diagram of a display apparatus 100 according to another exemplary embodiment.

Referring to FIG. 4, the display apparatus 100 includes a plurality of receivers 110-1 through 110-n, a plurality of signal processors 120-1 through 120-n, a display unit 130 (e.g., display), and a controller 140, a synchronization signal generator 150, and an interface unit 160 (e.g., interface). Herein, the controller 140 can control the synchronization signal generator 150 and the interface unit 160 to perform their corresponding operations.

The synchronization signal generator 150 generates a synchronization signal for synchronizing the glasses apparatus 200 corresponding to a content, according to a display timing of the content. That is, the synchronization signal generator 150 generates the synchronization signal for opening the shutter glasses of the glasses apparatus 200 at the display timing of the image frame of the content in the multi-view mode.

The interface unit 160 is connected to at least one glasses apparatus and performs communication. In so doing, the interface unit 160 can send the synchronization signal to the glasses apparatus 200 and receive a selection command from the glasses apparatus 200 by communicating with the glasses apparatus 200 according to any of various wireless schemes.

For example, the interface unit 160 can include a Bluetooth communication module for communicating with the glasses apparatus 200, generate the synchronization signal as a transport stream according to the Bluetooth communication standard, and send the transport stream to the glasses apparatus 200.

The transport stream includes time information for opening or closing the shutter glasses of the glasses apparatus 200 in synchronization with the display timing of the content. More specifically, the time information may include information on at least one of a left shutter open offset, a left shutter close offset, a right shutter open offset, and a right shutter close offset of the glasses apparatus 200.

The offset is delay information from a reference time defined per content to the open or close time of the shutter glass. That is, when the offset passes from the reference time, the glasses apparatus 200 opens or closes the left shutter glass and the right shutter glass.

For example, the reference time can be the time point when a vertical synchronization signal (that is, frame sync) is generated in the image frame. The transport stream can include reference time information and also include information of a clock signal used in the display apparatus 100. Thus, the glasses apparatus 200, upon receiving the transport stream, can synchronize its clock signal with the clock signal of the display apparatus 100 and open or close the shutter glasses by determining, using the clock signal, whether the offset passes from the vertical synchronization signal point.

Moreover, the transport stream can further include cycle information of the frame sync, and decimal point information when the cycle of the frame sync has a decimal point.

Meanwhile, the interface unit 160 can conduct pairing based on the Bluetooth communication scheme by transmitting and receiving a Bluetooth address and a PIN code to and from the glasses apparatus 200.

In an exemplary embodiment, the interface unit 160 may include a plurality of Bluetooth addresses, and one glasses apparatus may be connected to one Bluetooth address. In this case, a Bluetooth address may be assigned to each glasses apparatus in an ascending order or in a descending order according to the order where the glasses apparatus 200 is connected to the interface unit 160. The interface unit 160 may set to exempt the Bluetooth address used for the connection with the glasses apparatus 200 from being searched in order to prevent the Bluetooth address from being connected to another glasses apparatus.

When the pairing is completed, information relating to the glasses apparatus 200, for example, identification information of the glasses apparatus or a Bluetooth address used for pairing can be registered to the interface unit 160. The interface unit 160 matches the information of the glasses apparatus 200 to the transport stream corresponding to the display timing of the content, and sends the transport stream to the glasses apparatus 200 based on the information obtained through the pairing.

When receiving the transport stream, the glasses apparatus 200 can determine whether the transport stream corresponds to its glasses apparatus information, and open or close the glasses according to the time information of the transport stream.

In the present exemplary embodiment, the interface unit 160 and the glasses apparatus 200 communicate with each other according to the Bluetooth communication scheme by way of example. However, it is understood that one or more exemplary embodiments are not limited thereto. For example, according to one or more other exemplary embodiments, the interface unit 160 and the glasses apparatus 200 can adopt other communication schemes such as infrared communication and Zigbee, and various wireless communication schemes for transmitting and receiving signals by building a communication channel within a close range.

In the above exemplary embodiment, the interface unit 160 is a single communication module and performs communication with a plurality of glasses apparatuses, but the interface unit 160 may be realized as a plurality of communication modules and perform communication with each of the glasses apparatuses depending on exemplary embodiments. Alternatively, if the display apparatus 100 supports a plurality of wireless communication methods, the interface unit 160 may be configured to include a plurality of communication modules according to each of the wireless communication modules. For example, the interface unit 160 may include a plurality of communication modules according to various wireless communication methods, such as Bluetooth, Zigbee, Wifi, and so on.

Although not depicted in FIG. 2 or 4, the display apparatus 100 can further include a component for differently providing audio data of the content per user in the multi-view mode. That is, the display apparatus 100 can further include a demultiplexer for separating the video data and the audio data from the contents received at the receivers 110-1 through 110-n, an audio decoder for decoding the separated audio data, a modulator for modulating the decoded audio data to different frequency signals, and an audio output unit for sending the modulated audio data to the glasses apparatus 200. The audio data output from the audio output unit is provided to the user through an output device such as earphones of the glasses apparatus 200.

Meanwhile, in some cases, when the content includes additional information such as Electronic Program Guide (EPG) and subtitle information, the demultiplexer may additionally separate the additional data from the content. The display apparatus 100 may add the subtitle processed for the display through an additional data processor, to the corresponding image frame.

Figure 5:
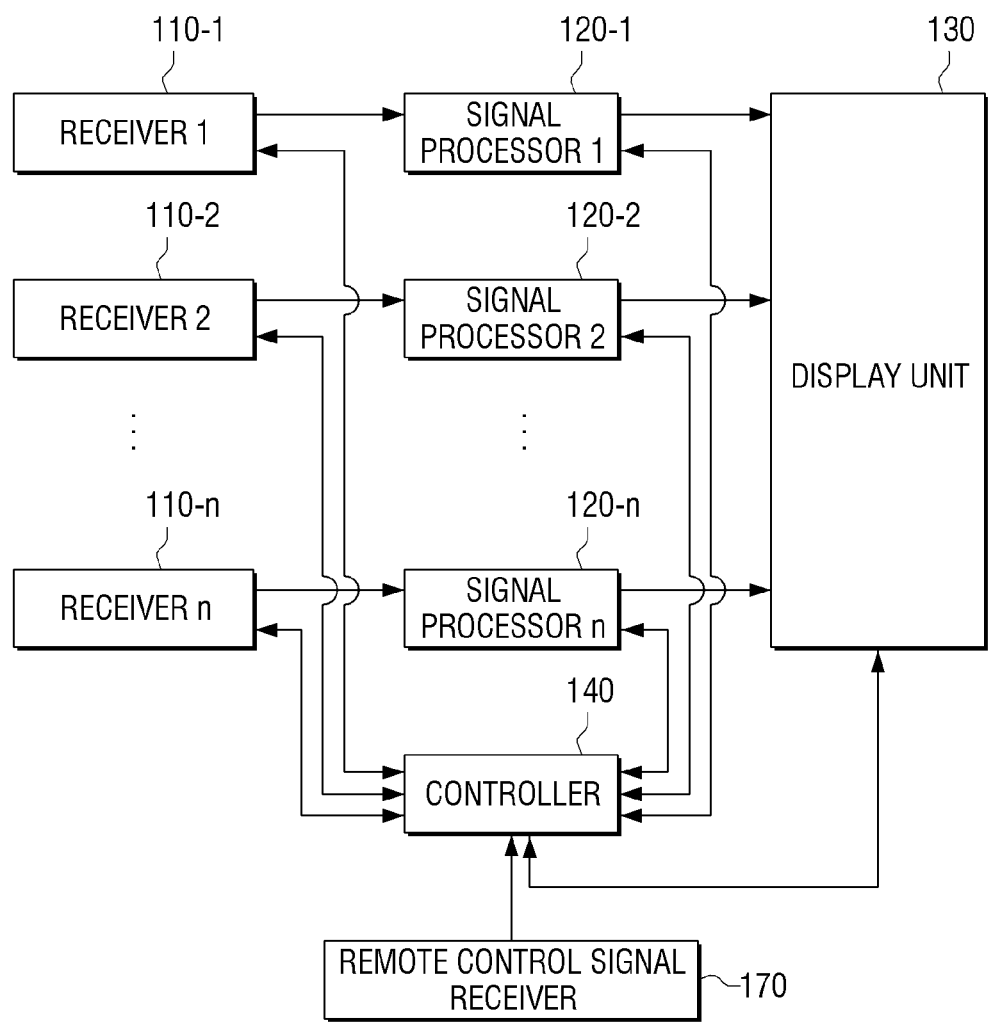
FIG. 5 is a block diagram of a display apparatus according to yet another exemplary embodiment.

FIG. 5 is a block diagram of a display apparatus 100 according to yet another exemplary embodiment.

Referring to FIG. 5, the display apparatus 100 includes a plurality of receivers 110-1 through 110-*n*, a plurality of signal processors 120-1 through 120-*n*, a display unit 130 (e.g., display), a controller 140, and a remote control signal receiver 170.

The remote control signal receiver 170 can receive a control command from the remote control apparatus 300. The controller 140 can control the display apparatus 100 according to the control command received from the remote control signal receiver 170.

Figure 6:
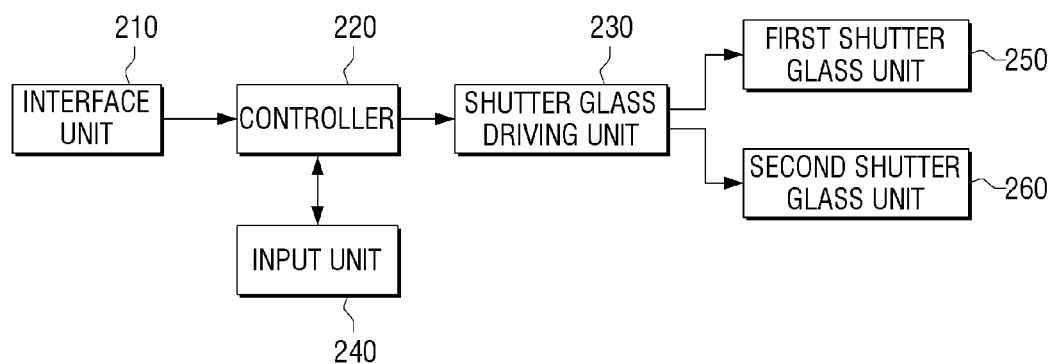
FIG. 6 is a block diagram of a glasses apparatus according to an exemplary embodiment.

FIG. 6 is a block diagram of a glasses apparatus 200 according to an exemplary embodiment.

The glasses apparatus 200 of FIG. 6 interworks with the display apparatus 100 of FIG. 2 which alternately displays the plurality of the contents on the image frame basis, and includes an interface unit 210 (e.g., interface), a controller 220, a shutter glass driving unit 230 (e.g., shutter glass driver), an input unit 240 (e.g., inputter), a first shutter glass unit 250 (e.g., first shutter glass), and a second shutter glass unit 260 (e.g., second shutter glass).

The interface unit 210 communicates with the display apparatus 100. For example, the interface unit 210 can be implemented using a Bluetooth communication module for receiving the synchronization signal and sending the information of the glass apparatus 200 by communicating with the display apparatus 100. The interface unit 210 can send the user command (or the control command) input through the input unit 240 to the display apparatus 100.

As stated earlier, the synchronization signal can be received in the form of a transport stream according to the Bluetooth communication standard, and can include the time information for opening or closing the first shutter glass unit 250 and the second shutter glass unit 260 of the glass apparatus 200 in synchronization with the display timing of the content. The information included in the transport stream has been exemplarily described in FIG. 4 and shall not be further explained.

The controller 220 controls the operations of the glasses apparatus 200. Particularly, the controller 220 controls the shutter glass driving unit 230 by forwarding the synchronization signal received by the interface unit 210 to the shutter glass driving unit 230. That is, based on the synchronization signal, the controller 220 controls the shutter glass driving unit 230 to generate a driving signal to drive the first shutter glass unit 250 and the second shutter glass unit 260.

The shutter glass driving unit 230 generates the driving signal based on the synchronization signal received from the controller 220. In particular, based on the synchronization signal, the shutter glass driving unit 230 can open at least one of the first shutter glass unit 250 and the second shutter glass unit 260 according to the display timing of one of the contents displayed by the display apparatus 100.

The first shutter glass unit 250 and the second shutter glass unit 260 open or close the shutter glasses according to the driving signal received from the shutter glass driving unit 230. For example, the first shutter glass unit 250 and the second shutter glass unit 260 open the shutter glasses at the same time when one of the contents is displayed, and close the shutter glasses when another content is displayed. Hence, the user wearing the glasses apparatus 200 can view one content from among a plurality of displayed contents.

Meanwhile, as for 3D content, the first shutter glass unit 250 and the second shutter glass unit 260 can open and close the glasses in turn. That is, according to the driving signal, the first shutter glass unit 250 can be opened when the left-eye image of a 3D content is displayed and the second shutter glass unit 260 can be opened when the right-eye image is displayed.

The input unit 240 receives a user command for controlling the display apparatus 100. In particular, the input unit 240 can receive a selection command for selecting one of the content views. To do so, the input unit 240 may include a button, a touch pad, or a toggle button through which a user can select a content view. If a user inputs a command to select one of a plurality of content views to the input unit 240, the interface unit 210 may transmit information regarding the selected content view to the display apparatus 100 and receive a sync signal corresponding to the selected content view from the display apparatus 100. In addition, the input unit 240 can receive a response signal for confirming or denying the user command or the control command to control one of the content views.

Hereinafter, operations of the display apparatus 100 corresponding to predefined events are illustrated with examples.

<Event for Receiving the Control Command to Control One of the Content Views>

Figure 7:
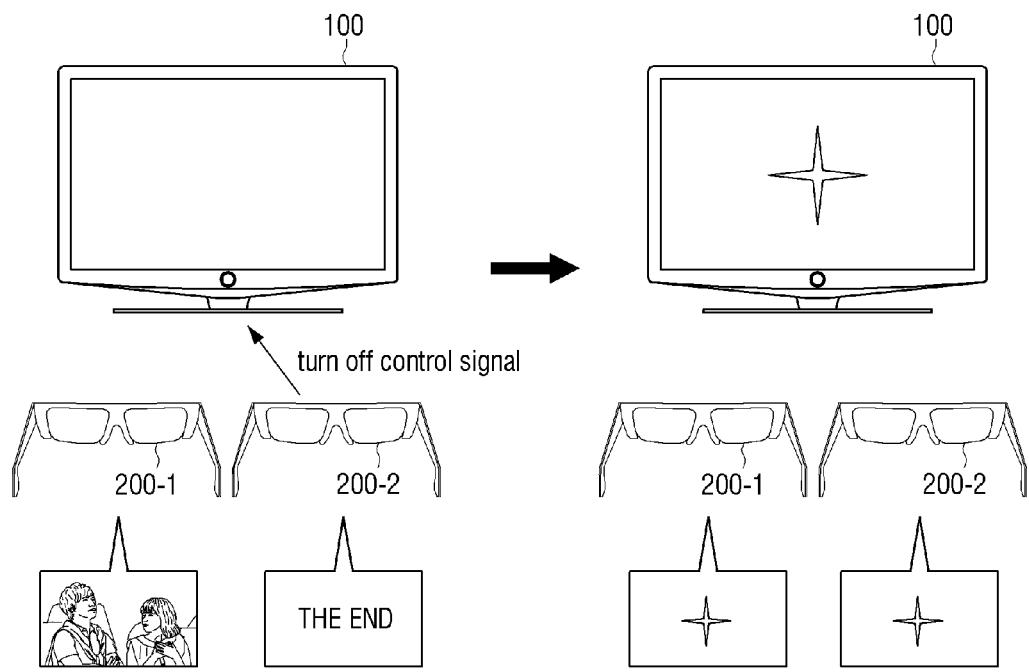
FIG. 7 is a diagram of influence of a control command, received from a remote control apparatus, on another content view.

FIG. 7 is a diagram of influence of a control command received from a remote control apparatus 300 upon another content view.

When a plurality of viewers wear the glasses apparatuses 200-1 and 200-2 synchronized with different content views and one user watching the content inputs the user command to control his/her content view, the user command can affect the user watching the content in the other content view. Since the users watch their own contents, they can sometimes control the display apparatus 100 without noticing the other users. For example, when the content viewed through one glasses apparatus 200-1 shows a drama series and a movie of the content viewed through the other glasses apparatus 200-2 is over as shown in FIG. 7, the user wearing the other glass apparatus 200-2 may turn off the display apparatus 100. In this case, the content view of the glasses apparatus 200-1 is affected and, accordingly, it is necessary to inform the other user of the control command input and to seek concurrence of the control according to a type of the control command.

According to an exemplary embodiment, upon receiving the control command to control one of the content views, the controller 140 can selectively display a message informing of the control command input in the other content view according to the type of the control command. As mentioned earlier, when the control command is input to the display apparatus 100 from the glasses apparatus 200-1 or 200-2 watching one content view, the control command can affect the other content view. By contrast, a control command may not affect the other content view at all and the affect, if any, can be ignored. Hence, when receiving the control command from the remote control signal receiver 170, according to the type of the control command, the controller 140 controls to provide notice of the control command input through the other content view or performs the control operation when there is no need to provide notice.

The control command is divided to an executable operation and an execution restriction operation, based on the influence on the other content view. When there is no influence on the other content view, the control command is defined as the executable operation in either case. By contrast, when the other content view is affected, the execution can change according to the agreement or the disagreement of the other user or other conditions. Hence, the control command is defined as the execution restriction operation.

The executable operation indicates the control command when the other content view is not affected as aforementioned. The control command for the executable operation can include a content change command for changing the content of the selected content view, a volume control command for adjusting an audio signal volume of the content, an on-screen display (OSD) menu display command for displaying an OSD menu on the selected content view, and an image quality adjustment control for adjusting the quality of the image frame displayed in the selected content view.

For example, when a volume control signal is input from one glasses apparatus 200 and the volume of the corresponding glasses apparatus 200 is controlled, the other content view is not affected at all. Hence, this volume control operation corresponds to the executable operation. Yet, since the control command for controlling an output volume (master volume) of the display apparatus 100 can affect the other content view, such a control command is the execution restriction operation. For example, as for the content change operation, various contents can be viewed through the single content view. Hence, the content change in one content view does not affect the other content views.

The execution restriction operation indicates the control command when the other content view is affected. For example, the execution restriction operation includes a power on/off control operation and an output characteristic control operation of the display apparatus 100. That is, the user watching one content view may turn off the display apparatus 100. In this case, the user can no longer watch the other content view and accordingly the power off control operation corresponds to the execution restriction operation. Further, the output characteristic control operation indicates the control command of dependency of the display apparatus 100. For example, screen brightness can be adjusted or the reception manner can be changed.

Figure 8:
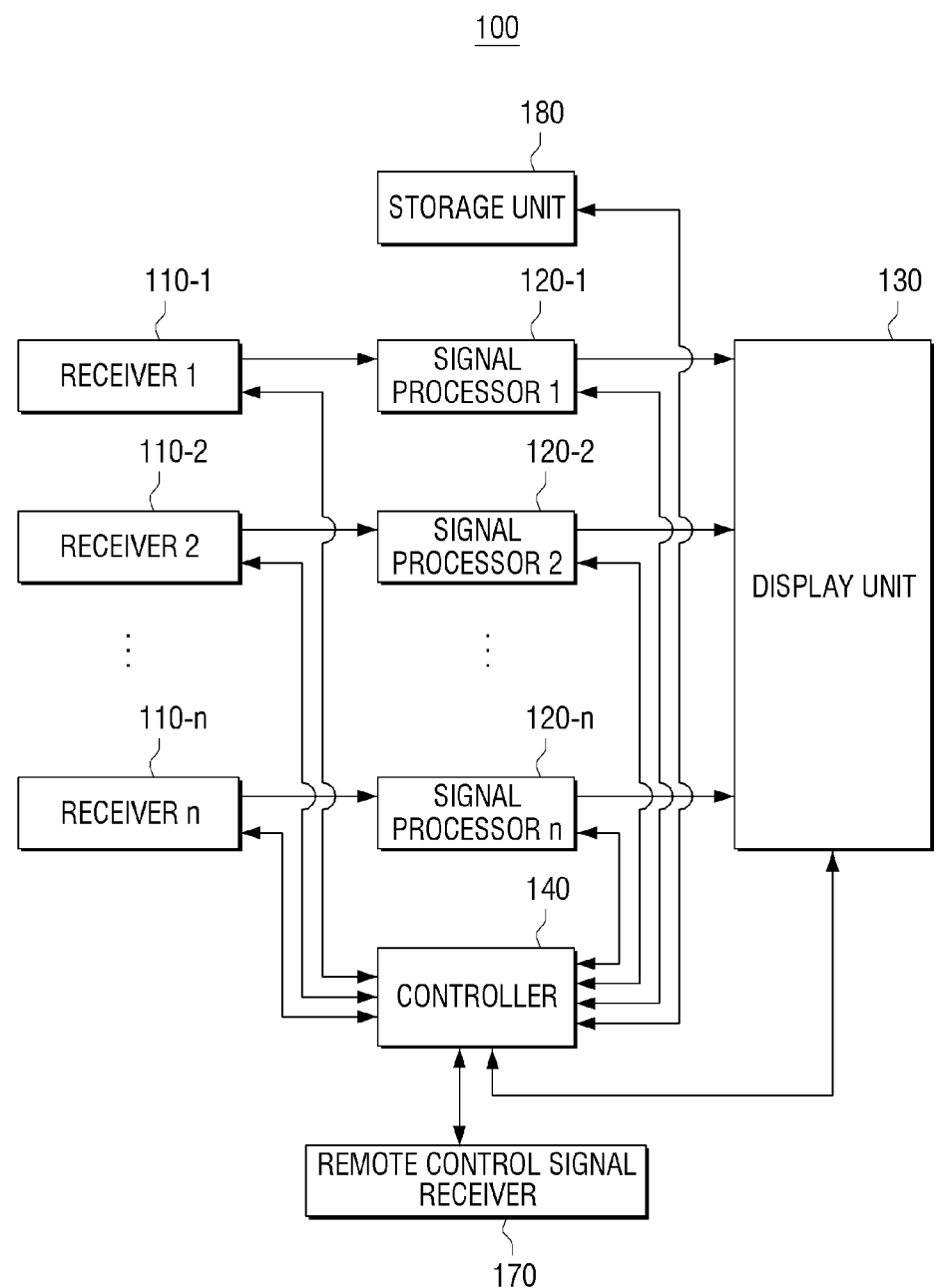
FIG. 8 is a block diagram of a display apparatus according to still another exemplary embodiment.

FIG. 8 is a block diagram of a display apparatus 100 according to still another exemplary embodiment.

The display apparatus 100 of FIG. 8 distinguishes the executable operation and the execution restriction operation, and can further include a storage unit 180 (e.g., storage) for storing control operation information divided to the executable operation and the execution restriction operation.

When receiving the control command from the remote control signal receiver 170, the controller 140 can determine whether the received control command is the executable operation or the execution restriction operation by comparing the received control command with the control operation information stored to the storage unit 180.

When the control command pertains to the executable operation, the controller 140 performs the control operation corresponding to the control command for the content view. That is, for the control command to control the volume of the content view, the controller 140 sends the volume control signal without providing notice in the other content view. By contrast, when the control command pertains to the execution restriction operation, the controller 140 controls the signal processor 120 and the display unit 130 to display the message notifying the control command input in the other content view. For example, the signal processor 120 converts the message relating to the control command to image data and mixes the image data with the image frame of the other content view. The display unit 130 outputs the mixed image frame in the other content view. For example, when the power off control signal is input through one content view, a message, "User of the channel No. 1 wants to turn off the display," can be displayed in the other content view.

At this time, the user watching the other content view can send the response signal for agreeing or disagreeing with the control command to the display apparatus 100. For example, the glasses apparatus 200 can receive the signal for agreeing or disagreeing with the control command from the user through the input unit 240 and forward the signal to the display apparatus 100 through the interface unit 210. The user may send the signal through the remote control apparatus 300, or directly input the signal through an input unit (e.g., inputter) of the display apparatus 100. In case of the signal input through the input unit 240 of the glasses apparatus 200-1, when the response signal agreeing with the control command is received from the other glasses apparatus 200-2 matched to the other content view, the controller 140 executes the control operation corresponding to the control command. When the response signal disagreeing with the control command is received, the controller 140 does not execute the control operation corresponding to the control command. That is, when an input to turn the display apparatus 100 off is received, the controller 140 displays a message, "User of the channel No. 1 wants to turn off the display. Do you agree to it?" in the other content view. When the response signal agreeing with the power off is received from the interface unit 210 of the other glasses apparatus 200 matched to the other content view, the controller 140 turns off the display apparatus 100.

Meanwhile, after a predetermined period of time passes and the display apparatus 100 does not receive a response signal, priority can be granted to the content view of the control command input and the control operation corresponding to the control command can be performed. That is, when receiving no response signal of the control command from the other glasses apparatus 200 matched to the other content view over a preset time starting from the message output time, the controller 140 can execute the control operation corresponding to the control command. However, the priority can be granted to the other content view by considering the influence on the other content view, and thus the disagreement response signal reception may be determined. In this case, no control operation corresponding to the control command is performed. When the control commands are differentiated and no response signal is received, the control operation corresponding to the control command may be executed by determining the disagreement response signal reception with the great influence on the other content view and determining the agreement signal reception with little influence.

Accordingly, the execution of the control operation can differ according to the influence of the control command input in one of the content views upon the other content view. Particularly, more stabilized multi-view display is accomplished by notifying the great influence on the other content view through the other content view and obtaining the agreement on the execution.

Meanwhile, in the above-described exemplary embodiment, if a control command regarding the execution restriction command is input, other content view is notified that the control command is input and the agreement on the execution is obtained. However, in some cases, a control operation corresponding to a control command may be performed with respect to the content view for which the control command is input without notifying other content view of the fact that the control command is input. For example, if a command to turn off power of a display apparatus is input, only the content view for which the command to turn off power is input may be terminated without notifying other content views of the fact that the command is input.

Hereinbelow, exemplary embodiments will be described in greater detail.

In FIG. 7, a message in response to a control command may be displayed on a content view, depending on whether a command has an influence on a content view that is viewed through a glasses apparatus 200-1.

When the display 130 outputs a plurality of content views including a first content view and a second content view by combining an image frame, the controller 140, when a control command to control the first content view is received from a remote control apparatus, determines whether a control command has an influence on the second content view.

In this case, the controller 140, when the received control command is a control command that has an influence on the second content view, may control the display 130 to output a message in response to the received control command on at least one of the first content view and the second content view. In this case, the message may be at least one of a message notifying the control command input, a message asking whether to agree with the control command execution, and a message notifying that the control command is not executable. For example, the controller 140 may control to display a message notifying that the control command is not executable on the first content view.

However, when the received control command is a control command that has no influence on the second content view, the controller 140 executes the control command.

In addition, the controller 140, when the received control command is a control command that has an influence on the second content view, controls to display a message asking whether to agree with the control command execution on the second content view, and when a signal agreeing with the control command execution is received, executes the control command.

Meanwhile, on the second content view, whether to receive a message in response to the control command input is selectable.

In addition, the controller may grant priority on at least one of the first content view and the second content view.

Priority may be granted in various ways.

According to an exemplary embodiment, priority may be assigned on a content view corresponding to a preset glasses apparatus. For example, highest priority may be assigned for a content view corresponding to a preset glasses apparatus. For example, priority that precedes over a preset glasses apparatus 200 may be set. In this case, even though a control command is received from another glasses apparatus, if there is an influence on a glasses apparatus that has a greater priority, the display apparatus 100 does not operate in response to the control hand. On the other hand, when a control command is received from a glasses apparatus having greater priority, even though the control operation has an influence on another glasses apparatus, the display apparatus 100 is operated accordingly.

The controller 140 may grant priority on content views corresponding to glasses apparatuses based on a time or order of pairing. That is, a glasses apparatus 200 that is paired with the display apparatus 100 first may be granted with highest priority. In other words, the glasses apparatus 200 that is paired with the display apparatus 100 earlier may be granted with priority. That is, the glasses apparatus registered in the display apparatus 100 first may be granted with priority, but a glasses apparatus registered later may not be granted with priority.

In addition, it is also possible to determine priority of a content view corresponding to a user based on a user's account information. That is, priority may be granted according to account information of a log-in user. A user may log in a user account by using a user input apparatus such as a remote controller, a mobile device, etc. Furthermore, the user account is connected to a content view that a corresponding user is viewing. The display apparatus 100 may grant priority according to account information of a user. Accordingly, when a user A inputs a control command to the display apparatus 100 through the user's own account, the controller 140 of the display apparatus 100 may control the display apparatus 100 according to priority of an account of the user A. However, when the control command has an influence on a content view that another user B is viewing, and the priority of an account of the user A is not greater than that of the account of the user B, the controller 140 will not operate the display apparatus 100 in response to the control command.

As described above, in some cases, when a control command is input from any user, the control command has no influence on another content view. In these cases, the controller 140 may control to display a message on a control command input on the content view where a control command is input through an OSD, or the like. In addition, when the aforementioned control command is input through a remote controller, the remote controller may display a message on its own display as an OSD, or the like. In addition, the controller 140 operates the display apparatus 100 according to the control command.

Herein, the cases where a control command has no influence on another content view may be executable operations as described above. For example, the executable operations may include a content change command for changing a content of the selected content view, a volume adjustment command for adjusting volume of an audio signal of the content, an OSD menu display command for displaying an OSD menu on the selected content view, and an image quality adjustment command for adjusting an image quality of an image frame displayed on the selected content view. However, when priorities of different users in the same content view are different from each other, the aforementioned operations are not executable either. In this case, whether or not to execute is determined according to priorities among the users. At this time, whether or not to execute is determined by determining priorities among users based on one or more of the aforementioned methods.

When a control command has an influence on another content view, the controller 140 controls to display the input control command as a message on the other content view so that viewers of the other content view can be notified. As described above, when there is no influence on another content view, if there is priority among users, a message is displayed on the same content view so that viewers of the same content view can be notified. In addition, when the above control command is input through a remote controller, a message can be displayed on a display.

The message can be at least one of a pop-up OSD type, an icon type, a ticker type, or the like, or can be inputted as a sound or a vibration. In addition, another user may select whether to receive a message notifying the control command input on a content view that the user is viewing. That is, a user may select whether to receive this message. If a user refuses to receive the message, even when the user has preceding priority over the user who inputs the control command, priority of this user will not be recognized. That is, in this case, even though a control command is input from a user with lower priority, the controller 140 operates the display apparatus 100 in response to a control command.

When a control command has an influence on another content view, the controller 140 may control the display 130 to display a message requesting acceptance or consent of one or more viewers of another content view. In this case, a view of another content view may transmit a message notifying acceptance or refusal to the display apparatus 100 through input means. When a message notifying refusal is received from at least one glasses apparatus 200 or a remote controller, the controller 140 of the display apparatus 100 may not execute a control command that has an influence on another content view. However, when a message of acceptance is received from one, some, or all of the glasses apparatuses 200 or from a remote controller, the controller 140 may operate the display apparatus 100 in response to the control command. In addition, in this case, the controller can control to display a message notifying operations of the display apparatus 100 on the display 130. Moreover, when no message is received during a preset time, the controller 140 may operate as if a message notifying acceptance is received.

Meanwhile, when priorities of users of a control right are not assigned beforehand, the controller 140 may operate as follows.

The controller 140 may execute a control command that has no influence on other content views as it is. However, an operation that has an influence on another content view may be notified via display on another content view to let other users know and request acceptance. In addition, only when the acceptance is obtained by the aforementioned method, the display apparatus 100 is controlled according to the control command. If there is no response on whether or not to accept, it can be regarded as if a message notifying acceptance is received, or it can be regarded as if a message notifying refusal is received, and thus a control command is not executed.

Furthermore, when priorities of a control right for users are not pre-assigned, the controller may operate so that only an operation that has no influence on other content views can be controlled. That is, in this case, the controller 140 may operate so that an operation that has an influence on other content views is inactivated. If a control command to execute an operation that has an influence on other content views is input, the controller 140 controls the display 130 to display a message notifying that this operation is not executable. In addition, in this case, the controller 140 may control to display a menu that includes operations that have no influence on other content views.

Meanwhile, a case in which an operation has an influence on other users of the same content view may be handled in the same manner as described above with respect to operations that have an influence on other content views.

Also, the controller 140 may control the display 130 to display a first control command list on the first content view, and a second control command list on the second content view.

In this case, the first control command list and the second command list can be separately displayed.

Moreover, the second control command list includes only commands that have no influence on the first content view. Accordingly, a user who watches the second content view can input the control commands in the second control command list, and thus the possibility that a control command that may have an influence on the first content view is input can be prevented.

Meanwhile, a scope of display of the second control command list or the first control command list can be set by a user setting input.

In the above-specified exemplary embodiments, the second control command list can be set to display a control command that may have an influence on the first content view. On the other hand, the second control command list may inactivate a control command that has an influence on the first content view by a user setting.

The first control command list may be configured in the same manner.

The first control command list may set a scope of display so that a list of control commands that may have an influence on the second content view is displayed, but may inactivate a control command that has an influence on the second content view by a user's setting.

<Event when at Least One of the Content Views is not Synchronized with the Glasses Apparatus>

When detecting that content is not connected to a glasses apparatus 200, the controller 140 controls to add and display a message object guiding a connection of the glasses apparatus 200, in the content view not mapped to the glasses apparatus 200, which is explained below with reference to FIG. 9.

Figure 9:
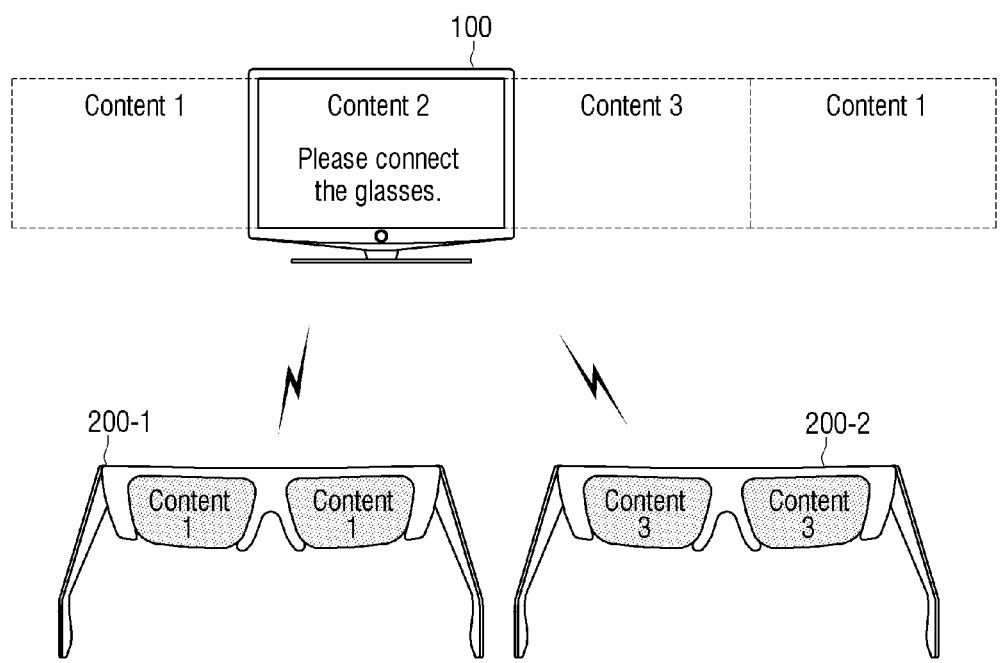
FIG. 9 is a diagram of a message object displayed to guide a connection to a glasses apparatus according to an exemplary embodiment.

FIG. 9 is a diagram of a message object displayed to guide to connect a glass apparatuses 200 according to an exemplary embodiment.

The glasses apparatuses 200-1 and 200-2 communicate with the display apparatus 100 using their own identification information. When the glasses apparatuses 200-1 and 200-2 are paired with the display apparatus 100, the identification information of the glasses apparatuses 200-1 and 200-2 are transmitted to the display apparatus 100. In another exemplary embodiment, a Bluetooth address of the interface unit 160 which is used for connection with the glasses apparatuses 200-1, 200-2 may be used as identification information. According to the identification information or the Bluetooth address received from the glasses apparatuses 200-1 and 200-2, the interface unit 160 of the display apparatus 100 transmits any one of the synchronization signals corresponding to the content views to the glasses apparatuses 200-1 and 200-2. In so doing, the mapping information between the content views and the glasses apparatuses 200-1 and 200-2 can be generated or stored.

Herein, the interface unit 160 of the display apparatus 100 can check the mapping information indicating the mapping between the contents and the glasses apparatuses 200-1 and 200-2 under the control of the controller 140, and determine whether the contents include content not mapped to the glasses apparatuses 200-1 and 200-2.

Upon detecting the content not synchronized with the glasses apparatuses 200-1 and 200-2, the signal processor 120, among the plurality of the signal processors 120-1 through 120-n, for processing the content not synchronized with the glass apparatus 200 can add the message object guiding a connection of the glasses apparatus 200, to the image frame of the corresponding content, and the display unit 130 can alternately display the image frame of the added message object with the image frame of the other content.

When a new glasses apparatus 200 is connected, the controller 140 can control to automatically synchronize the new glasses apparatus 200 with the content view not synchronized with the glasses apparatuses 200-1 and 200-2. When the corresponding content view is mapped to at least one glasses apparatus 200 according to the message object guiding the connection of the glasses apparatus 200, the controller 140 may control to make the message object displayed in the corresponding content view disappear.

Referring to FIG. 9, the display apparatus 100 displays the second content, and the glasses apparatuses 200-1 and 200-2 are synchronized with the first content view and the third content view respectively. When the second content is displayed, all of the shutter glasses of the glass apparatuses 200-1 and 200-2 are closed. Since there are no glasses synchronized with the second content view, the display apparatus 100 can add and display a message object, "Please connect the glasses," guiding to connect the second content view and the glasses apparatus 200.

Meanwhile, the viewers wearing the glasses apparatuses 200-1 and 200-2 and watching the first and third contents cannot see the message object displayed in the second content, whereas the viewer watching the display screen without the glass apparatus can see the display screen of the superimposed content images and see the message object added to the second content and superimposed on the other content images. Thus, the viewer watching the display screen without the glasses apparatus 200 can ascertain that part of the current content views are displayed without the synchronization with the glasses apparatuses 200-1 and 200-2.

Herein, when a new glasses apparatus 200 is connected to the display apparatus 100, the new glasses apparatus 200 can be automatically mapped to the second content view which is not mapped to the existing glasses apparatuses 200-1 and 200-2.

The message object guiding the connection of the glasses apparatus 200 can employ not only the message object of FIG. 9, but also any object providing notice that no mapping exists of the corresponding content with the glasses 200. For example, the message object can include a message notifying no mapping, such as, "The glasses are not connected," or a message providing the details of the glasses connection.

Thus, the user can intuitively perceive that the particular content is not currently connected to the glasses apparatus 200 without interrupting the viewer watching the content in the multi-view mode, and the content not connected to the glasses apparatus 200 can be mapped to the new glasses apparatus more easily.

<Event for Inputting the Multi-View Mode Start Command>

When the predefined event is an event for inputting a multi-view mode start command and the multi-view mode start command is input, the controller 140 can control to display the message object inquiring about whether to synchronize the corresponding content view in the image frame of each content view, and to sequentially map the contents to the glasses apparatuses 200-1 and 200-2, which is described below with reference to FIGS. 10A and 10B.

Figure 10A:
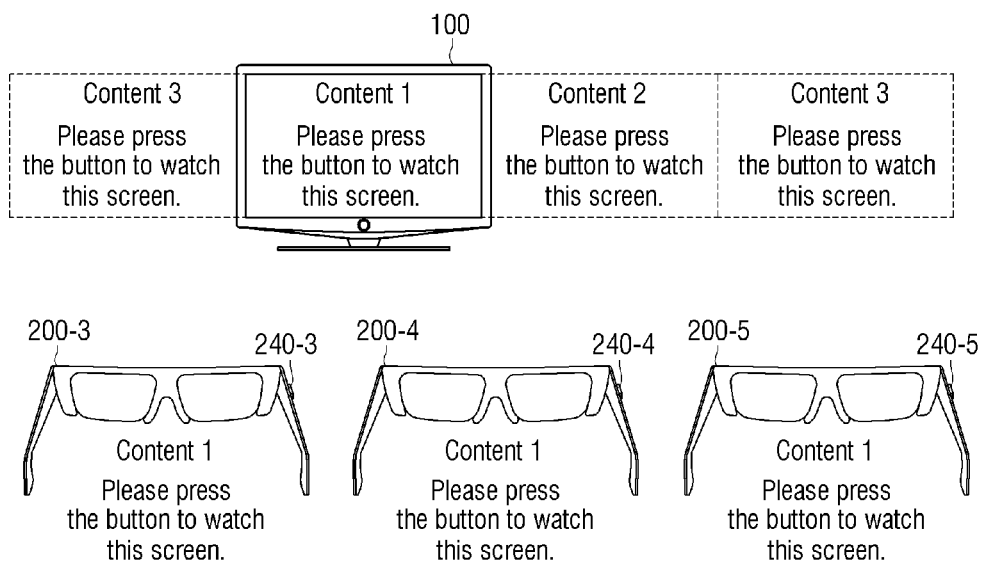
FIGS. 10A and 10B are diagrams of a message object displayed to inquire about whether to synchronize with content according to an exemplary embodiment.
Figure 10B:
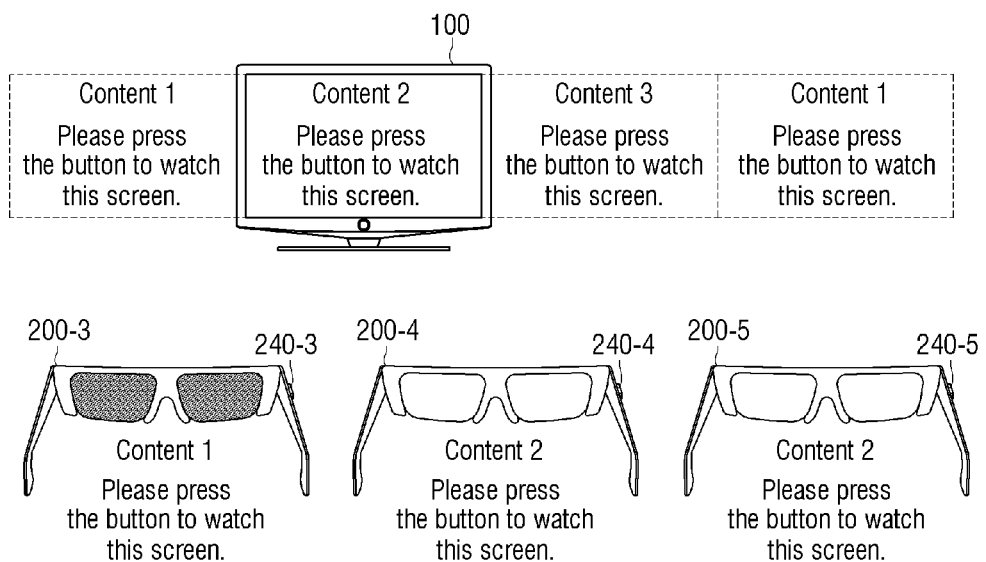

FIGS. 10A and 10B depict a message object displayed to inquire about whether to synchronize with the content according to an exemplary embodiment.

When the user inputs the multi-view mode start command, the display apparatus 100 alternately displays the plurality of the contents by initiating the multi-view mode. Herein, the signal processors 120-1 through 120-n can add the message object inquiring about whether to map the corresponding content in the image frame of each content, and the display unit 130 can alternately display the image frames of the added object.

The interface unit 160 sequentially maps the content views to glasses apparatuses 200-3, 200-4, and 200-5 connected to the display apparatus 100. Herein, one content view is mapped for a preset time, and when the preset time passes, another content view can be mapped. This applies to the plurality of the glasses apparatuses 200-3, 200-4, and 200-5 connected to the display apparatus 100.

Meanwhile, when receiving the response for the message from at least one glasses apparatus 200, the interface unit 160 can map the content view displayed at the point of the response reception and the glass apparatus which sends the response. The response to the message indicates a content selection command input through the input unit of the glass apparatuses 200-3, 200-4, and 200-5 or the remote control apparatus.

Referring to FIG. 10A, the display apparatus 100 alternately displays first, second, and third contents, and is currently displaying an image frame of the first content view. A message object, "Please press the button to watch this screen," is added to the image frame of each content. Meanwhile, all of the glass apparatuses 200-3, 200-4, and 200-5 are mapped to the first content view. When the selection command for selecting the first content currently mapped is input through an input unit 240-3 of the left glasses apparatus 200-3, the left glasses apparatus 200-3 sends the selection command to the display apparatus 100. Even when a preset time interval passes, the communication interface unit 160 of the display apparatus 100 can keep the mapping of the left glasses apparatus 200-3 and the first content.

In FIG. 10B, the glasses apparatus 200 is mapped to the second content view after the preset time passes from FIG. 10A. Yet, since the left glasses apparatus 200-3 is continuously mapped to the first content view by sending the selection command to the display apparatus 100 in FIG. 10A, the viewer wearing the left glasses apparatus 200-3 can keep watching the first content view. Meanwhile, the message object inquiring about the mapping is not added to the image frame of the first content view mapped for the preset time. Hence, the viewer selecting the first content can watch the first content without the interruption of the object when the preset time passes.

When the user inputs the selection command through the input unit 240-4 of the glasses apparatus 200-4 mapped to the second content in FIG. 10B, the glasses apparatus 200-4 sends the selection command to the display apparatus 100 and the communication interface unit 160 of the display apparatus 100 keeps the mapping of the glasses apparatus 200-4 and the second content.

Accordingly, the user can intuitively perceive the start of the multi-view mode and the input of the selection command to view a specific content.

The message object inquiring about the mapping with the corresponding content is not limited to the message object of FIGS. 10A and 10B in one or more other exemplary embodiments. That is, according to one or more other exemplary embodiments, any object that leads to the mapping with the corresponding content may be used. Additionally, a timer indicating the remaining time may be added and displayed in the image frame of the corresponding content so that the user can obtain the remaining time for inputting the selection command to select the content.

<Event when the Remote Control Apparatus Inputs the Control Authority Request Command>

When the predefined event is an event for inputting a control authority request command from the remote control apparatus 300 and the control authority request command is input, the controller 140 can control to add and display an image object indicating the control authority in the image frame of one of the plurality of the contents, which is described below with reference to FIGS. 11A and 11B.

Figure 11A:
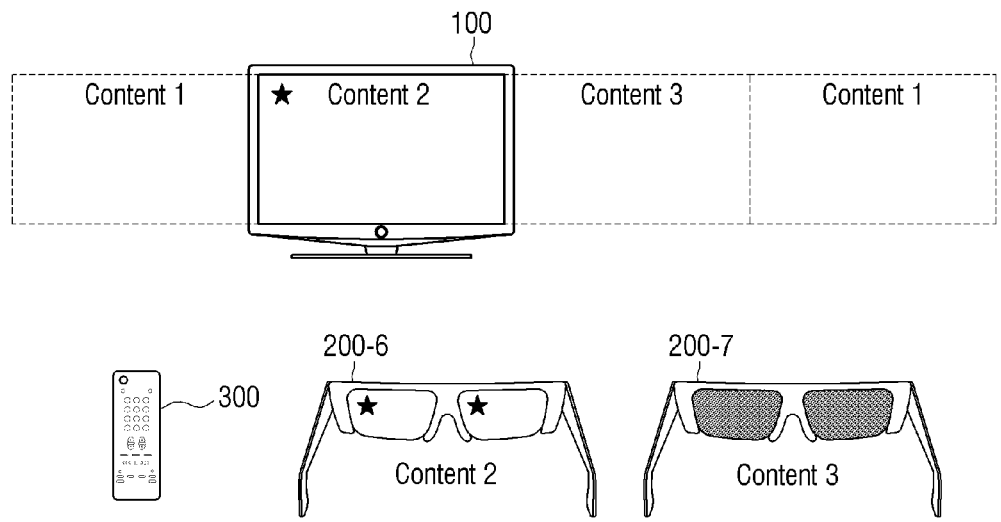
FIGS. 11A and 11B are diagrams of an image object indicating control authority according to an exemplary embodiment.
Figure 11B:
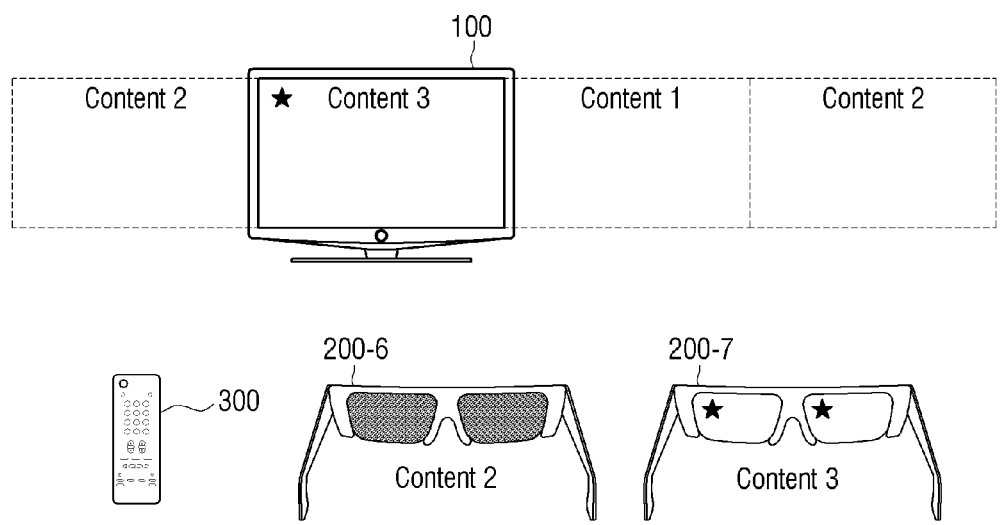

FIGS. 11A and 11B depict an image object indicating a control authority according to an exemplary embodiment.

When the control authority request command is input from the remote control apparatus 300, the image processor for processing the content displayed through the authorized content view among the plurality of the content views of the display apparatus 100 can add an image object indicating the control authority to the image frame of the corresponding content.

The controller 140 can control to sequentially change the content displaying the image object every time the control authority request command is input. That is, when the image object is added and displayed in the image frame of any one content and the control authority request command is input again from the remote control apparatus 300, the image object indicating the control authority is added and displayed in the image frame of any other content. Every time the control authority request command is input, the content displaying the image object can sequentially change. Hence, the viewer can intuitively perceive the authorized content view with ease.

The control authority request command indicates a user command which is input by the user watching the content through any one of the content views to control the corresponding content view. The control authority request command may be input by pressing or touching a particular button of the remote control apparatus 300, and a command input to control the display apparatus 100, such as a channel change or a volume control button, can be recognized as the control authority request command.

Referring to FIG. 11A, the control authority request is input from the user remote control apparatus 300 and a star-shaped image object indicating the control authority is added and displayed in the image frame of the second content. The viewer wearing the glasses apparatus 200-6 mapped to the second content, who is watching the second content, can perceive the image object indicating the control authority displayed in the display apparatus 100 and control the second content through the remote control apparatus 300. Herein, the control of the second content may correspond to the volume control corresponding to the second content, a display environment setup of the second content, or other content view by changing to other channel when the second content is a broadcasting program.

Meanwhile, the viewer wearing the glasses apparatus 200-7 mapped to the third content view can neither perceive the image object nor control the third content.

Herein, when the user re-inputs the control authority request command, the star-shaped image object indicating the control authority is added and displayed in the image frame of the third content. In FIG. 11B, the display apparatus 100 displays the third content with the object image added and the viewer wearing the glasses apparatus 200-7 can see the image object added to the third content. The viewer watching the second content can neither perceive the image object nor control the second content view.

When the control authority request command is re-input, the star-shaped image object is added and displayed in the image frame of the first content and can sequentially change every time the control authority request command is input.

The image object indicating the control authority can employ not only the star-shaped image object but also any image perceivable by the viewer. One or more other exemplary embodiments are not limited to the image object but may be applicable to a message object such as "control" indicative of the control authority. When the control authority request command is not re-input over a preset time, the controller 140 may make the image object disappear after the preset time.

The control authority request command may be input through not only the remote control apparatus 300, but also the input unit 240 of the glasses apparatus 200 in one or more other exemplary embodiments. In this case, the image object indicating the control authority can be added and displayed in the content view mapped to the glasses apparatus 200 of the input control authority request command.

<Event for Inputting the Multi-View Mode End Command>

When the predefined event is an event for inputting a multi-view mode end command and the multi-view mode end command is input, the controller 140 can control to add and display a message object notifying the multi-view end in the image frames of all of the contents, which is described below with reference to FIG. 12.

Figure 12:
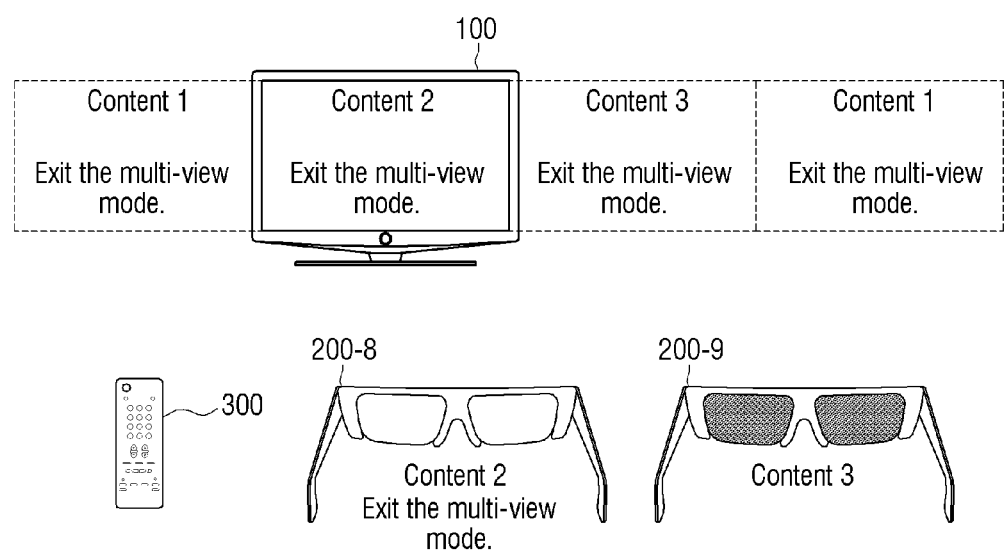
FIG. 12 is a diagram of a message object notifying multi-view end according to an exemplary embodiment.

FIG. 12 depicts a message object notifying a multi-view end according to an exemplary embodiment.

When the multi-view mode end command is input through the remote control apparatus 300, the display apparatus 100 can add and display a message object notifying the multi-view mode end in the image frames of all of the displayed contents, and terminate the multi-view mode.

Referring to FIG. 12, when the multi-view mode end command is input through the remote control apparatus 300, the display apparatus 100 adds and displays the message object notifying the multi-view mode end such as, "Exit the multi-view mode," in the image frames of all of the first, second, and third displayed contents. Hence, the viewer can intuitively learn that the multi-view mode is over.

The multi-view mode end command may be input through not only the remote control apparatus 300, but also the input unit 240 of the glass apparatus 200 in one or more other exemplary embodiments.

When the multi-view mode is over, only the content displayed before the multi-view mode is displayed and the other contents are not displayed any more. However, it is understood that one or more other exemplary embodiments are not limited thereto. For example, according to one or more other exemplary embodiments, only the content of the control authority before the multi-view mode is over may be displayed and the other contents may not be displayed.

While the object is, but not limited to, the message object and the image object in the above-described exemplary embodiments, various objects such as an icon, a logo, a text label, and a symbol can be represented in accordance with the predefined event.

The object addition to the image frame in the signal processor 120 can be carried out by the video processor of the image processor, and the frame rate converter may add the object to the image frame of the converted frame rate. Also, the additional data processor for processing the subtitle may add the object. That is, when the content is generated as the image frames, the object can be added in any phase before the content is output to the display unit.

Meanwhile, if a user watching content view A inputs a multi-view termination command with respect to the content view A while content views A and B are being output in a multi-view mode, the display apparatus 100 may be converted to a single-view mode. In this case, the display apparatus 100 may continuously output the content of the content view B for which a multi-view termination command is not input in the single-view mode. Once the mode is converted to the single-view mode, there is no need for the user to wear a glasses apparatus any longer and thus, the display apparatus 100 may add and output a message object, such as "The multi-view mode has been ended. You may take off the glasses apparatus." Accordingly, a user watching content view B may recognize that the multi-view mode has been ended. However, if the content output from the content view B is 3D contents, the user needs to keep wearing the glasses apparatus to watch the 3D contents. In this case, a message object informing that the mode has been converted to a single-view 3D, such as "The multi-view mode has been ended, and the mode will be converted to a 3D mode" may be added.

In another exemplary embodiment, if a multi-view mode is ended, an interface for selecting one content view to be displayed in a single-view mode from among a plurality of content views may be provided.

Figure 13:
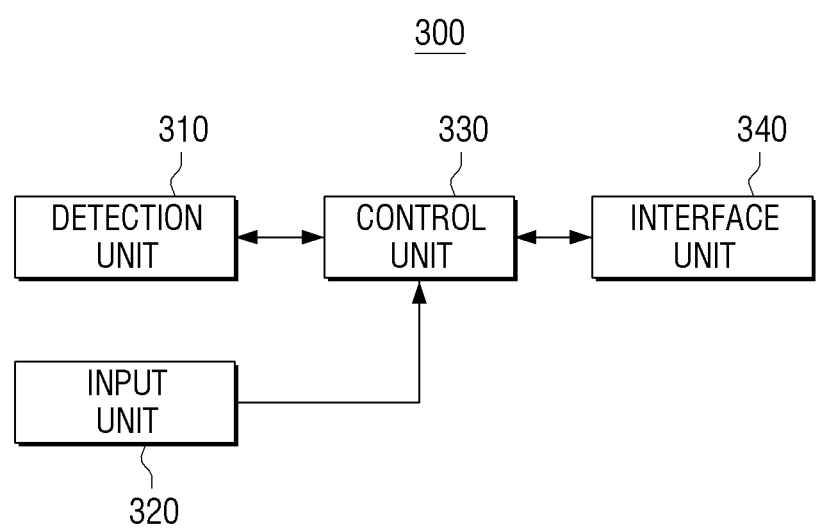
FIG. 13 is a block diagram of a remote control apparatus according to an exemplary embodiment.

FIG. 13 is a block diagram of a remote control apparatus 300 according to an exemplary embodiment.

Referring to FIG. 13, the remote control apparatus 300 includes a detection unit 310 (e.g., detector or sensor), an input unit 320 (e.g., inputter), a control unit 330 (e.g., controller), and an interface unit 340 (e.g., interface).

The detection unit 310 receives signals from the plurality of the glasses apparatuses 200 respectively corresponding to the plurality of the content views, detects the glasses apparatus 200 closest to the remote control apparatus 300, and sends the detected signal to the control unit 330 of the remote control apparatus 300.

In more detail, the detection unit 310 can detect distances between the glasses apparatuses 200 and the remote control apparatus 300, and detect the glasses apparatus 200 closest to the remote control apparatus 300 from among the glasses apparatuses 200.

In this case, the detection unit 310 can detect the glasses apparatuses 200 using a sensing method, such as radio frequency identification (RFID) or magnetic sensor, capable of sensing short distances between the remote control apparatus 300 and the glasses apparatuses 200.

Using the RFID of the detection methods, the detection unit 310 can compare the reception strength of radio frequency (RF) signals received from the glasses apparatuses 200, and detect the glasses apparatus 200 transmitting the RF signal of the maximum reception strength as the closest glasses apparatus.

Figure 14:
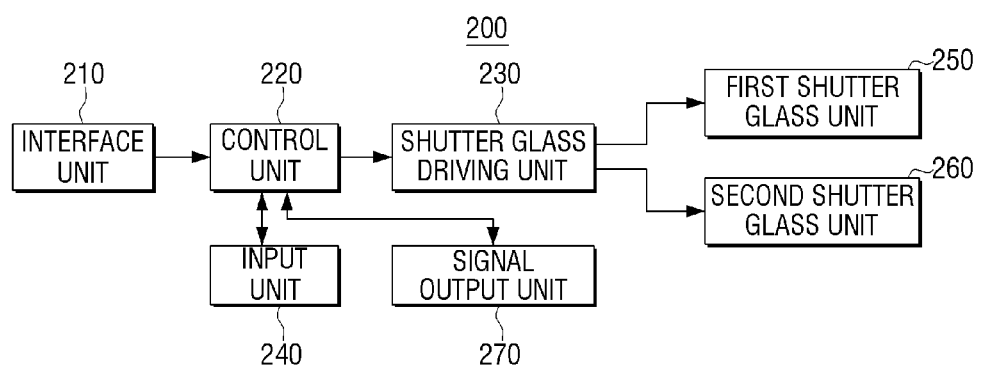
FIG. 14 is a block diagram of a glasses apparatus according to another exemplary embodiment.

The glasses apparatus 200 can further include a signal output unit 270 (e.g., outputter) (see FIG. 14). FIG. 14 is a block diagram of a glasses apparatus 200 according to another exemplary embodiment. The signal output unit 270 of the glasses apparatus 200 can include an RFID tag or a component corresponding to the distance sensing method of the remote control apparatus 300. In detail, when the remote control apparatus 300 senses the distance to each glasses apparatus using the RFID, the signal output unit 270 can include the RFID tag.

The input unit 320 of the remote control apparatus 300 receives the user command. The input unit 320 can employ various input interfaces, such as a keypad, a touch pad, a jog shuttle, a jog stick, a dial, etc., at least alone or in combination, for changing the channel or the audio volume.

When the user selection command is input through the input unit 320, the control unit 330 generates a control signal for controlling the content view corresponding to the closest glasses apparatus 200 detected from among the glasses apparatuses 200, according to the user selection command.

The control signal can include at least one of a glasses apparatus ID, which is the identification information of the closest glasses apparatus 200, or the content view information corresponding to the closest glasses apparatus 200, and the control command for controlling the content view of the display apparatus 100.

To do so, the remote control apparatus 300 may receive information regarding a content view corresponding to a glasses apparatus from the glasses apparatus. According to an exemplary embodiment, each glasses apparatus may include information regarding the content view may be included in a signal to an output signal to sense a distance, and the control unit 330 may generate a control signal using information regarding a content view of the nearest glasses apparatus. According to another exemplary embodiment, if the nearest glasses apparatus is determined, the control unit 330 may request and receive information regarding a content view from the nearest glasses apparatus. Meanwhile, the glasses apparatus 200 and the remote control apparatus 300 may transmit/receive information regarding a content view through the signal output unit 270 and the detection unit 310, but they may be configured to include a separate interface unit to transmit/receive information regarding a content view.

The control command can include, for example, any one of the content change command for changing the content of the content view corresponding to the glasses apparatus 200 closest to the remote control apparatus 300, the volume control command for adjusting the audio signal volume of the content, the OSD menu display command for displaying the OSD menu on the content view, the image quality adjustment control for adjusting the quality of the image frame displayed in the content view, etc.

The interface unit 340 sends the control signal generated by the control unit 330 to the remote control signal receiver 170 of the display apparatus 100. The communication between the interface unit 340 and the remote control signal receiver 170 can adopt a communication scheme such as Bluetooth, infrared communication, and Zigbee, and various wireless communication schemes for transmitting and receiving signals via a communication channel, e.g., a short range communication channel.

In the present exemplary embodiment, a user can selectively control the content view mapped to the closest glasses apparatus 200 by changing the location of the remote control apparatus 300 without having to repeatedly input the user command to selectively control one of the content views. Notably, the message or the image object can be added and displayed in the content view currently controllable.

Figure 15:
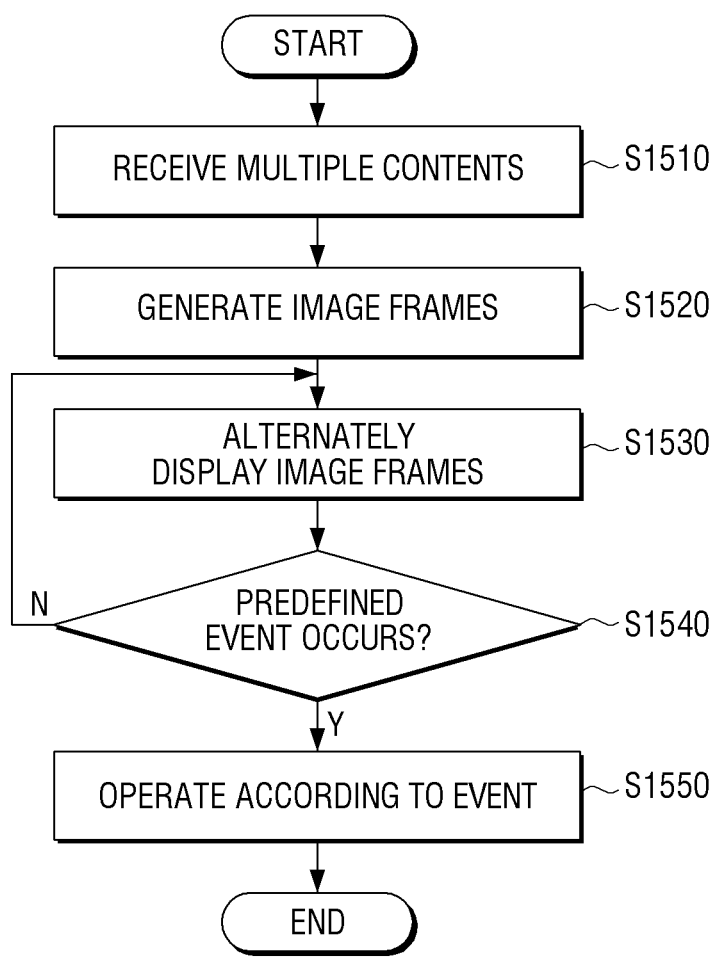
FIG. 15 is a flowchart of a controlling method of a display apparatus according to an exemplary embodiment.

FIG. 15 is a flowchart of a controlling method of a display apparatus 100 according to an exemplary embodiment. Redundant descriptions relating to the display apparatus 100 shall be omitted herein.

The display apparatus 100 receives a plurality of the contents (operation S1510). More specifically, the display apparatus 100 receives a plurality of the different contents. Next, the display apparatus 100 generates the image frames (operation S1520). The display apparatus 100 may generate the image frames by processing the received contents. The display apparatus 100 alternately displays the image frames (operation S1530). That is, the display apparatus 100 generates the plurality of the content views and alternately displays the image frames of the contents corresponding to the content views.

Herein, when the predefined event occurs (operation S1540-Y), the display apparatus 100 performs the operation corresponding to the event (operation S1550). The predefined event can include an event for receiving a control command to control one of the content views from the remote control apparatus 300, an event when at least one of the contents is not synchronized with the glasses apparatus 200, an event for inputting a multi-view mode start command, the event for inputting a control authority request command from the remote control apparatus 300, an event for inputting the multi-view mode end command, etc.

The event for receiving the control command from the remote control apparatus 300 to control one of the content views is explained below with reference to FIGS. 16 and 17.

Figure 16:
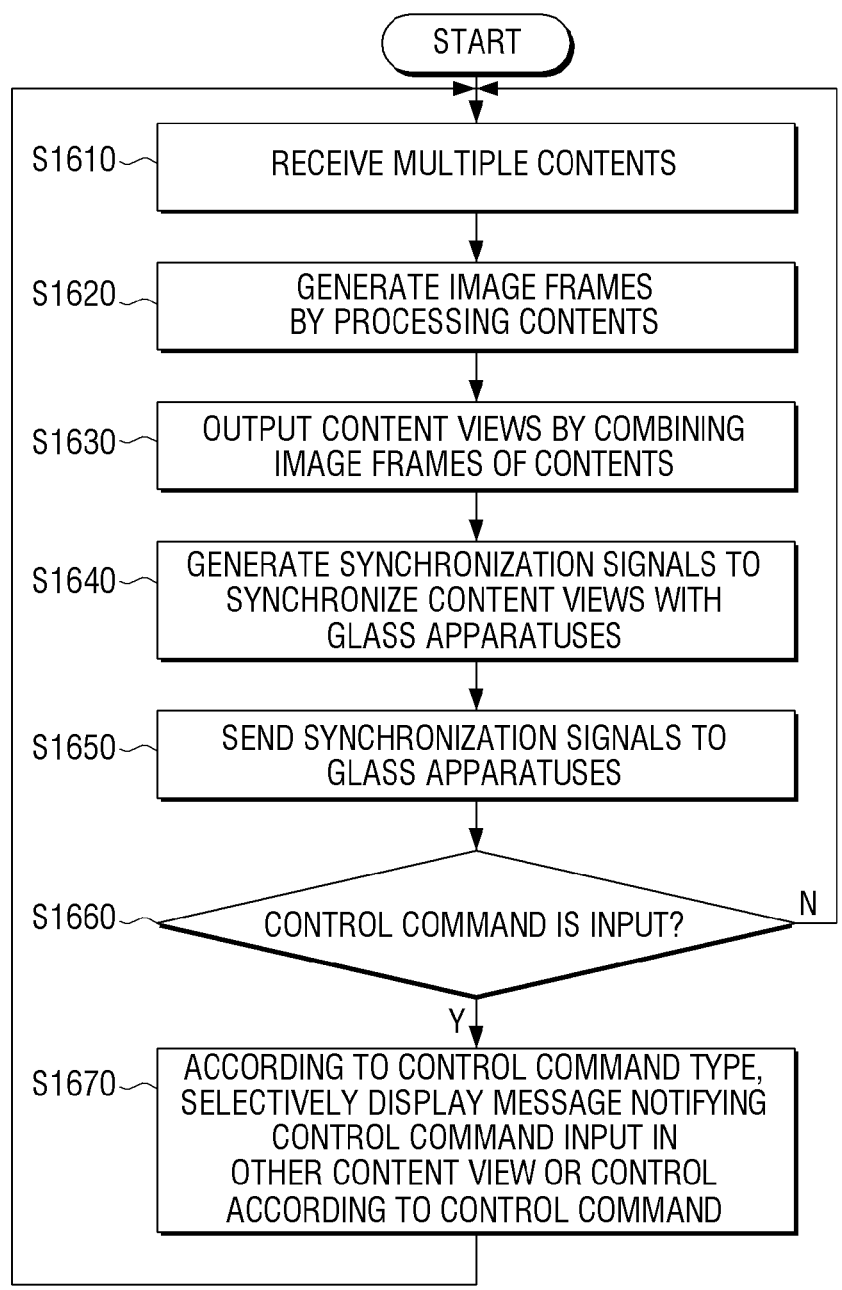
FIG. 16 is a flowchart of a controlling method of a display apparatus according to another exemplary embodiment.
Figure 17:
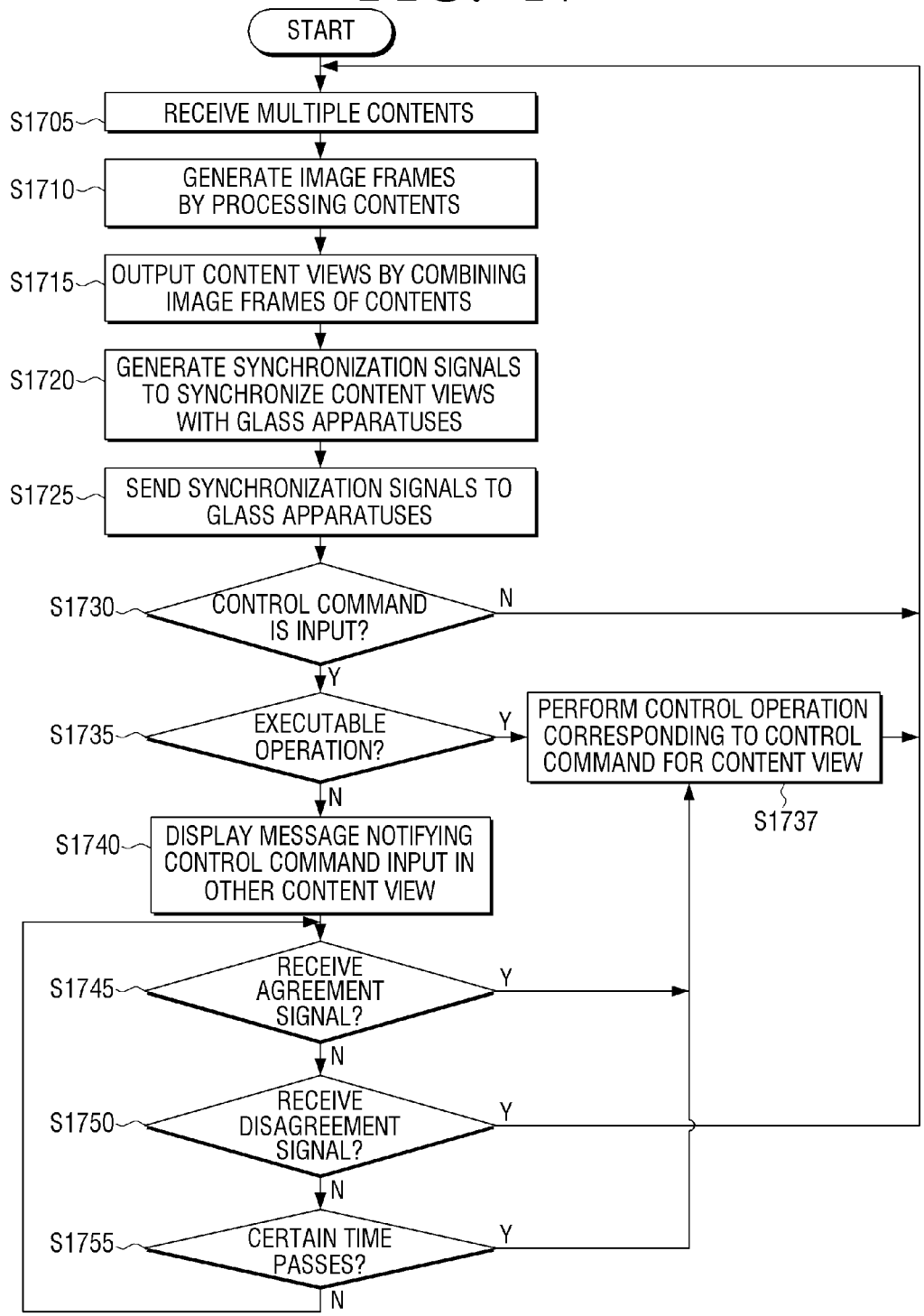
FIG. 17 is a flowchart of a controlling method of a display apparatus according to yet another exemplary embodiment.

FIG. 16 is a flowchart of a controlling method of a display apparatus 100 according to another exemplary embodiment, and FIG. 17 is a flowchart of a controlling method of a display apparatus 100 according to yet another exemplary embodiment.

The receivers 110 of the display apparatus 100 receive a plurality of contents (operations S1610 and S1705), and the signal processors 120 generate the image frames by processing the contents (operations S1620 and S1710). The display unit 130 outputs the plurality of the content views by combining the image frames of the contents (operations S1630 and S1715), and the synchronization signal generator 150 generates the synchronization signals to synchronize the content views and the glasses apparatuses 200 (operations S1640 and S1720). The interface unit 160 transmits the synchronization signals to the glasses apparatuses 200 (operations S1650 and S1725). When a control command for any one content view is input (operations S1660-Y and S1730-Y) while the plurality of the content views is output, the display apparatus 100 determines whether the control command is the executable operation. Upon determining the executable operation (operation S1735-Y), the display apparatus 100 executes the operation corresponding to the control command (operation S1737). When determining the execution restriction operation (operation S1735-Y), the display apparatus 100 displays the message notifying the control command input in the other content view (operation S1740). When the agreement signal for the execution restriction operation is received from the glasses apparatus 200 matched to the other content view (operation S1745-Y) or when the agreement signal is not received and no signal is received for a predetermined period of time (operation S1755-Y), the display apparatus 100 executes the operation corresponding to the control command similarly to the executable operation (operation S1737). By contrast, upon receiving the disagreement signal (operation S1750-Y), the display apparatus 100 does not conduct the operation corresponding to the control command.

Meanwhile, when the predefined event is the event when at least one of the content views is not mapped to a glasses apparatus 200 in FIG. 15 and the content views include the content view not mapped to the glasses apparatus 200, the method adds and displays the message object guiding to connect the glasses apparatus 200 in the image frame of at least one content view not mapped to the glasses apparatus 200.

When the predefined event is the event for inputting the multi-view mode start command and the multi-view mode start command is input, the display apparatus 100 adds and displays the message object inquiring about whether to synchronize the corresponding content in the image frame of each content view, and sequentially maps the contents to the glasses apparatuses 200. Upon receiving the response to the message from the at least one glasses apparatus 200 or the remote control apparatus 300, the display apparatus 100 can map the content displayed when the response is received, and the glasses apparatus 200 sending the response.

When the predefined event is the event for inputting the control authority request command from the remote control apparatus 300 and the control authority request command is input, the display apparatus 100 adds and displays the image object indicating the control authority in the image frame of one of the contents. The content displaying the image object can sequentially change every time the control authority request command is input.

When the predefined event is the event for inputting the multi-view mode end command and the multi-view mode end command is input, the display apparatus 100 adds and displays the message object notifying the multi-view end in the image frames of all of the contents.

Figure 18:
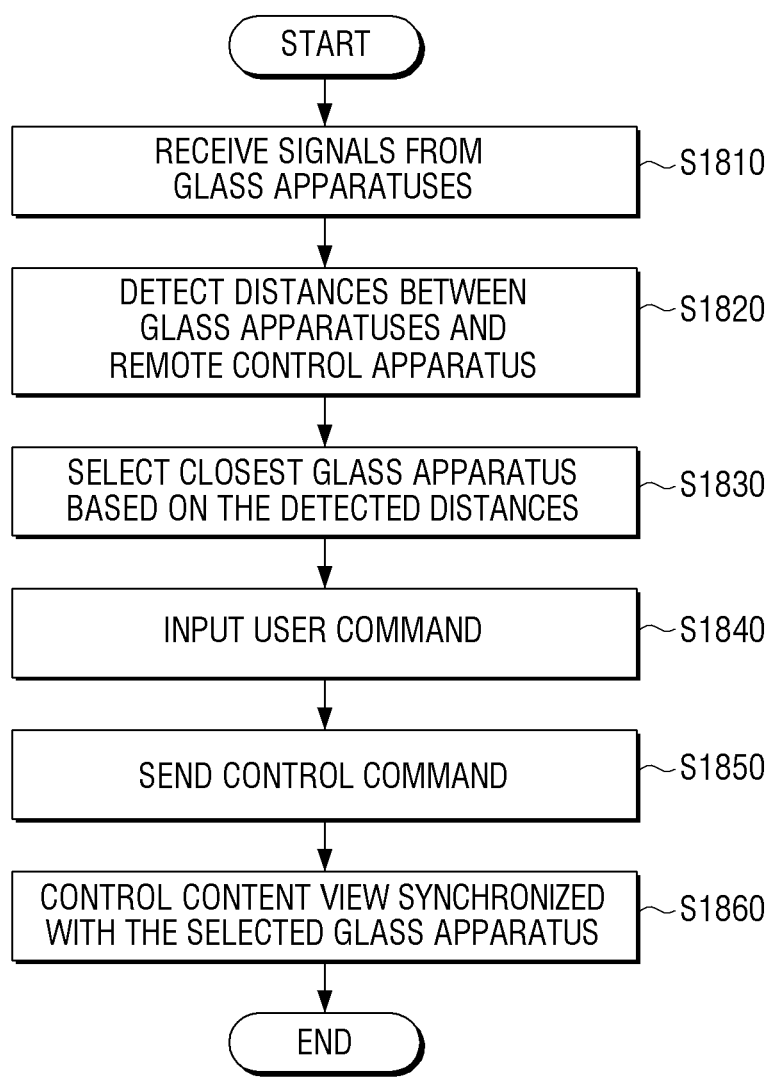
FIG. 18 is a flowchart of a controlling method of a remote control apparatus according to an exemplary embodiment.

FIG. 18 is a flowchart of a controlling method of a remote control apparatus 300 according to an exemplary embodiment.

Referring to FIG. 18, the remote control apparatus 300 receives the signals continuously generated from the glasses apparatuses 200, through the detection unit 310 (operation S1810), and calculates the distances between the remote control apparatuses 300 and the glasses apparatuses 200 by analyzing the signals (operation S1820).

The control unit 330 receives the calculated values from the detection unit 310 and selects the glasses apparatus 200 closest to the remote control apparatus 300 (operation S1830). When the user command is input through the input unit 320 (operation S1840), the control unit 330 generates and transmits the control command to the display apparatus 100 through the interface unit 340 (operation S1850).

The display apparatus 100 receives the control command through the remote control signal receiver 170, and the controller 140 of the display apparatus 100 controls the content view synchronized with the selected glasses apparatus 200 by analyzing the received control command (operation S1860).

As such, when users wearing the glasses apparatuses 200 and watching selected content views at the same time through the display apparatus 100 control their content views, each user can easily control the content and the audio of his/her content view simply by bring the remote control apparatus 300 closer to his/her glasses apparatus 200 than the other glasses apparatuses 200 and inputting the intended control command, without having to separately manipulate the mode in advance.

Meanwhile, a program for executing the methods according to various exemplary embodiments can be stored on various recording media.

Specifically, a code for executing the methods can be stored to various non-volatile recording media such as flash memory, Read Only Memory, (ROM), Erasable Programmable ROM (EPROM), Electronically Erasable and Programmable ROM (EEPROM), hard disc, removable disc, memory card, USB memory, and CD-ROM.

<Display Apparatus Based on Polarized Light Method and Glasses Apparatus>

The above-mentioned various exemplary embodiments may be performed through a display apparatus based on a polarized light method and a glasses apparatus. Hereinafter, the configuration and operation of a display apparatus based on a polarized light method and a glasses apparatus will be explained with reference to FIGS. 19 to 23.

<Configuration and Operation of Display Apparatus>

Hereinafter, a configuration and operation of a display apparatus based on a polarized method will be explained.

Figure 19:
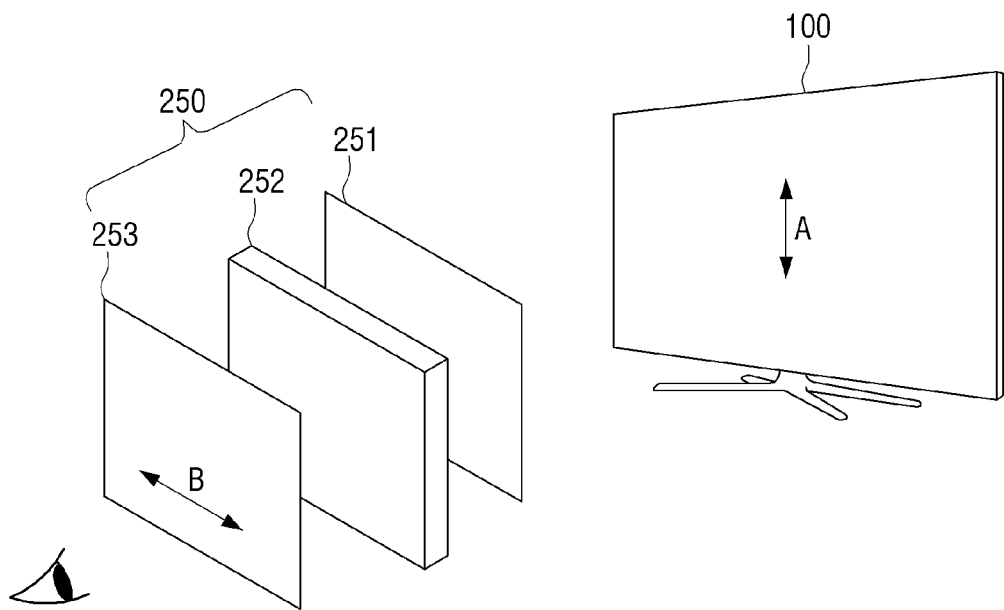
FIG. 19 is a view of an exemplary embodiment of a system through which a polarized image can be viewed.

FIG. 19 is a view which illustrates an exemplary embodiment of a system through which a polarized image can be viewed, As illustrated in FIG. 19, a system through which a polarized image can be viewed includes a display apparatus 100 and a glasses apparatus.

The display apparatus 100 is a component which outputs an image and particularly, outputs an image which is polarized in a specific direction, such as in a horizontal direction or in a vertical direction. As illustrated in FIG. 19, if a display apparatus 100 outputs an image which is polarized in a vertical direction A, a glasses apparatus may transmit only an image which is polarized in a horizontal direction B and block an image which is polarized in the vertical direction A. In this case, a viewer wearing glasses may not watch an image which is polarized in the vertical direction. As such, the display apparatus 100 includes various polarizing means or mechanisms to polarize output images.

As an example of a polarizing means, the display apparatus 100 may further include a polarizing panel. The polarizing panel is provided on the surface of the screen of the display apparatus 100, and polarizes an image output from the display apparatus 100 in a predetermined direction. Polarization may be performed as one of linear polarization, left-circular polarization, and right-circular polarization.

However, in order to provide a multi-view displaying a plurality of contents or display 3D contents including a left-eye image and a right-eye image according to various exemplary embodiments, the display apparatus may output a polarized image in a plurality of directions. The method may be divided into a pattern retarder method and an active retarder method.

Figure 20:
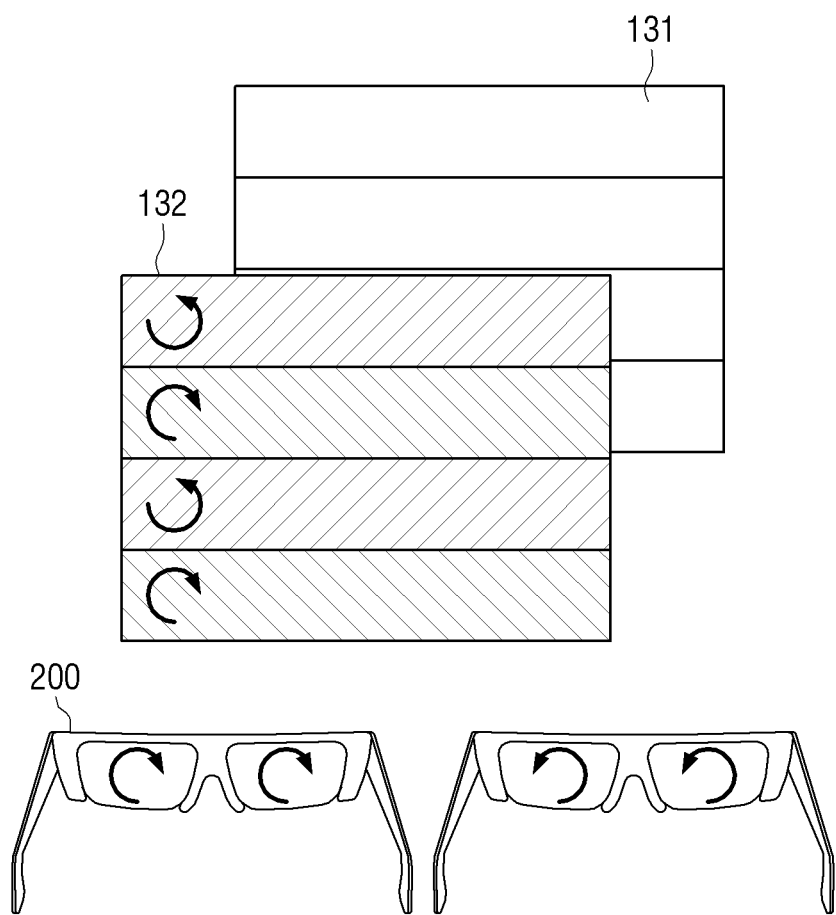
FIG. 20 is a view which is provided to explain a pattern retarder method according to an exemplary embodiment.

FIG. 20 is a view provided to explain the pattern retarder method, according to an exemplary embodiment. According to FIG. 20, as an example, a polarization may be set differently as a polarizing panel having different light axes for each area of a display image is provided. Such a method is referred to as a pattern retarder method and the polarizing panel includes a pattern retarder 132.

The pattern retarder 132 is attached to a display panel 131 of the display apparatus. The pattern retarder 132 includes first patterns facing odd number lines in a pixel array of the display panel 131 and second patterns facing even number lines in a pixel array of the display panel 131. As mentioned above, in this case, the light axis of the first patterns and the light axis of the second patterns are different from each other. For example, each of the first patterns and the second patterns may delay the face of incident light by ¼ and −¼ wavelengths, respectively. In this case, linearly polarized light is converted into circularly polarized light in a different direction. That is, the first patterns of the pattern retarder 132 may convert the light of an image displayed on an odd number line of a pixel array into left-circular polarized light, and the second patterns of the pattern retarder 132 may convert the light of an image displayed on an even number line of a pixel array into a right-circular polarized light.

In this case, a polarizing filter of a first glasses apparatus may have the same polarization axis as the first patterns of the pattern retarder 132. In addition, a polarizing filter of a second glasses apparatus may have the same polarization axis as the second patterns of the pattern retarder 132. That is, the first glasses apparatus may transmit the light of the left-circular polarized image while blocking the light of the right-circular polarized image, and the second glasses apparatus may transmit the light of the right-circular polarized image while blocking the light of the left-circular polarized image. Accordingly, different viewers may watch images which are polarized in different ways. In the case of a 3D image, a left-eye polarizing filter and a right-eye polarizing filter of one glasses apparatus have different polarization axes and may view a left-eye image and a right-eye image respectively.

Meanwhile, the pattern retarder 132 may be configured to be controlled electrically so as to change a polarization direction. In the above-described exemplary embodiment, if it is necessary to view a right-circular polarized image through the first glasses apparatus and a left-circular polarized image through the second glasses apparatus, the pattern of the odd number indication line and the pattern of the even number indication line of the display apparatus may be changed with each other.

To do so, for example, the pattern retarder 132 may be realized as a liquid cell. The orientation of the liquid cell is switched in accordance with a driving voltage, and the characteristics of polarized light vary depending on the switched orientation. Herein, the characteristics of polarized light may be phase or direction of polarized light. That is, if polarized light enters and a specific driving voltage is applied to a liquid cell for orientation, the wavelength of the incident light may be delayed. For instance, the pattern retarder 132 including a liquid cell may change the direction of a circular polarized light by changing the phase of the circular polarized light in an odd number indication line or may reverse the direction of a circular polarized light by changing the phase of the circular polarized light in an even number indication line. Although the liquid cell is not technically limited, if it is realized as a twist TN cell and an applied voltage is '0,' the incident light is rotated and a polarization direction may be changed by 90 degree by the twisting of liquid molecules. That is, if the incident light is linearly polarized, the polarization direction is rotated by 90 degrees, if the incident light is left-circularly polarized, the polarization direction is changed to the right-circular polarized light, and the right-circular polarized light is changed to the left-circular polarized light.

FIG. 21 is a view illustrating a case where contents are being watched through a glasses apparatus having a polarizing lens according to the pattern retarder method, according to an exemplary embodiment.

In the above-described exemplary embodiment, the polarization axes of patterns vary depending on each horizontal pixel line. However, each pattern area of the pattern retarder may not necessarily be divided by a vertical line. That is, as illustrated in FIG. 21, the pattern retarder may include the third patterns facing odd number lines for each vertical line and the fourth patterns facing even number lines. Herein, the polarizing filter of one glasses apparatus 200-11 may have the same polarization axis (horizontal direction) as the first patterns of the pattern retarder. In addition, the polarizing filter of another glasses apparatus 200-12 may have the same polarization axis (vertical direction) as the second patterns of the pattern retarder. Each glasses apparatus views content 1 and content 2, respectively.

Figure 22:
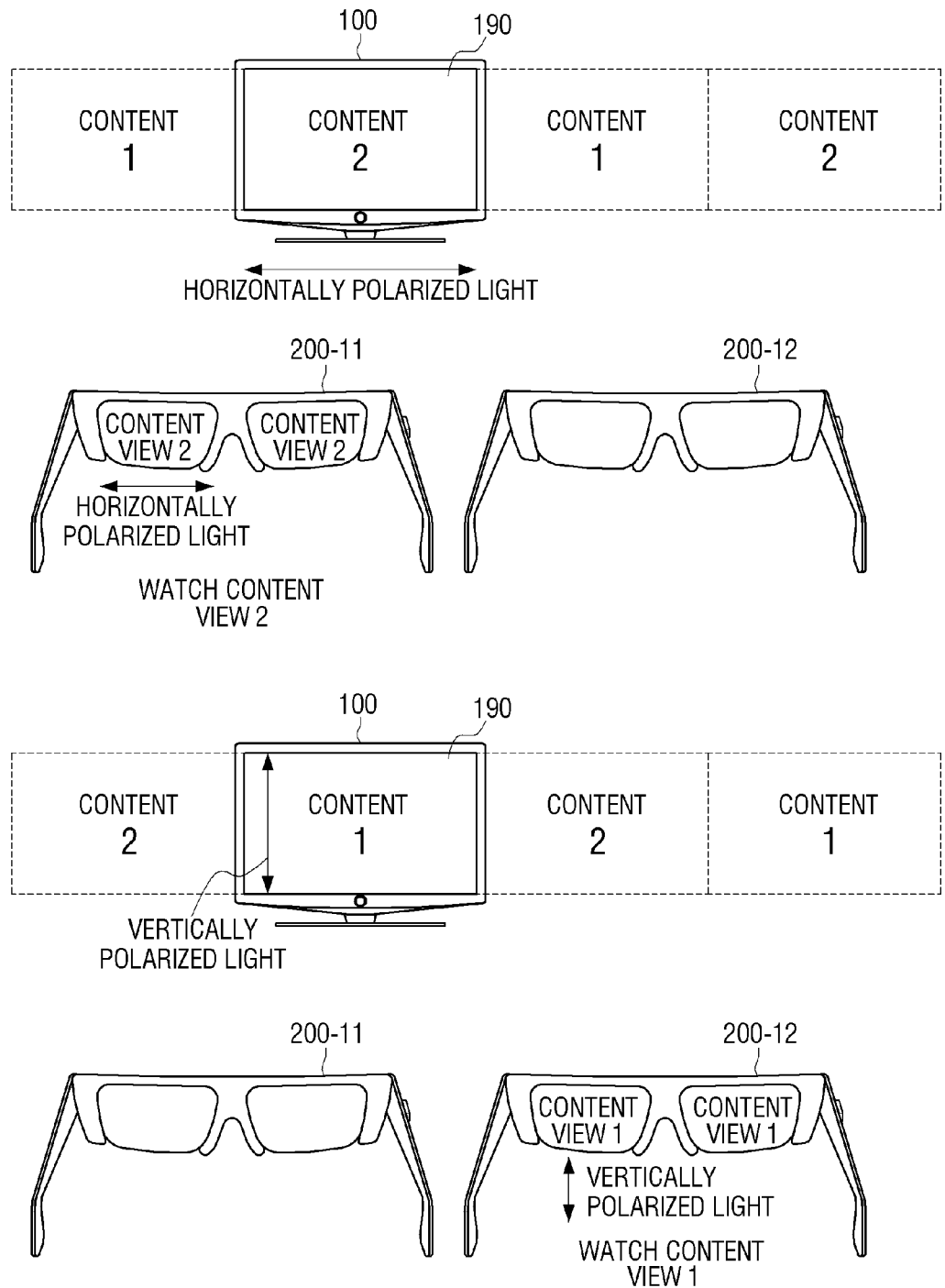
FIG. 22 is a view of a case where contents are being watched through a glasses apparatus having a polarizing lens according to an active retarder method, according to an exemplary embodiment.

FIG. 22 is a view illustrating a case where contents are being watched through a glasses apparatus having a polarizing lens according to the active retarder method, according to an exemplary embodiment.

Meanwhile, just like the pattern conversion of the above-described pattern retarder 132, the characteristics of polarized light in the entire polarizing panel may be changed. In particular, as described above, the characteristics of polarized light is to be changed whenever the image frame is changed if the above-explained method for providing multi-view by displaying image frames alternately is provided in a display apparatus based on a polarized light method. To do so, the display apparatus may further include a polarizing element 190. The polarizing element may further include a liquid layer to polarize an image. The display apparatus 100 controls the liquid layer for each horizontal line or vertical line using a driving voltage of different levels and polarizes a content image output from the display apparatus 100 in a certain direction. That is, as illustrated in FIG. 22, the polarization direction is changed by changing the characteristics of polarized light of a polarizing panel when an image frame is displayed.

In FIG. 22, if a horizontally-polarized content view 2 is displayed, the content view 2 can be viewed through the glasses apparatus 200-11, but not through the glasses apparatus 200-12. When content 1 is displayed, the display apparatus 100 outputs a displayed image by polarizing the image vertically, and a viewer wearing the glasses apparatus 200-12 may watch content view 1.

As such, if a plurality of contents are polarized differently for each frame before being output, the contents may be provided to a viewer without deterioration in resolution. However, in this case, the display apparatus 100 is to raise a frame rate of the display apparatus 100 and have shutter glasses to change a polarization axis so that a glasses apparatus may correspond to the display apparatus 100. In the case of the above-mentioned pattern retarder method, it is not necessary to change the frame rate, and a user may watch an image using a glasses apparatus without shutter glasses, but resolution may be deteriorated.

<Configuration of Glasses Apparatus>

Figure 23:
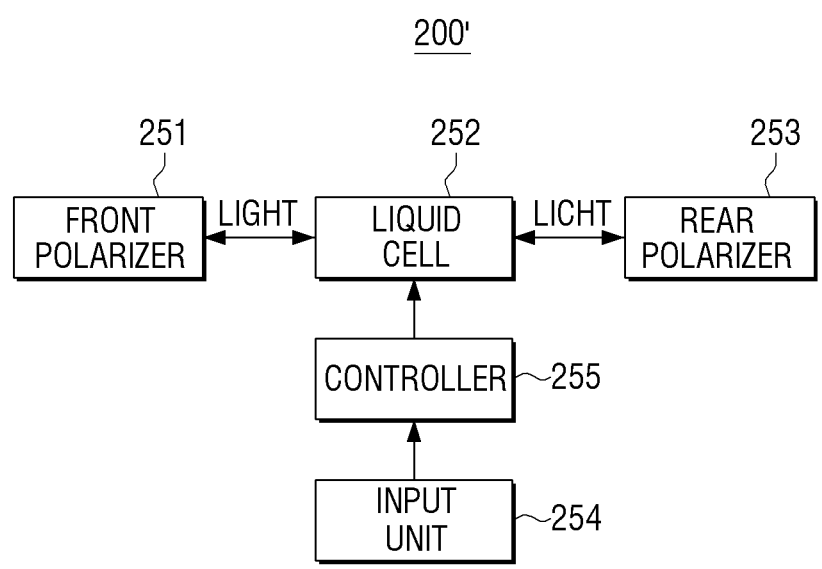
FIG. 23 is a block diagram of a configuration of a glasses apparatus based on a polarized light method according to an exemplary embodiment.

Hereinafter, a configuration and an operation of a glasses apparatus based on a polarized light method will be explained. FIG. 23 is a block diagram illustrating a configuration of a glasses apparatus 200' based on a polarized light method according to an exemplary embodiment. Referring to FIG. 23, the glasses apparatus 200' based on a polarized light method according to various exemplary embodiments includes a front polarizer 251, a liquid cell 252, a rear polarizer 253, an input unit 254 (e.g., inputter), and a control unit 255 (e.g., controller).

As described above, a glasses apparatus 200' transmits an image if the image has the same light axis as the image polarized in a display apparatus and blocks an image if the image crosses at right angles. Accordingly, a user wearing the glasses apparatus 200' may watch an image selectively.

As an exemplary embodiment of a glasses apparatus based on a polarized light method, there is a glasses apparatus 200' having a fixed polarization means or mechanism. That is, a lens has a predetermined light axis, and only a polarized image to be consistent with the predetermined light axis is transmitted by the lens. Such a glasses apparatus may be used both in a display apparatus based on the above-mentioned pattern retarder method and in a display apparatus based on a multi-view method by displaying image frames alternately. Each glasses apparatus 200' does not require a separate sync operation with the display apparatus and thus, the glasses apparatus 200' is highly cost-effective and has less flicker effect.

However, if a user wishes to watch a polarized image corresponding to another light axis which is different from the predetermined light axis, the user is to wear a glasses apparatus having a different light axis or replace a polarizing lens. The user may watch the polarized image simply by replacing a polarizing lens mounted in the glasses apparatus and inserting a new polarizing lens. However, depending on the polarization characteristics of an image, the user may replace a lens manually each time.

Accordingly, in an another exemplary embodiment, a glasses apparatus may include a means or mechanism to change the polarization characteristics of a lens. Hereinafter, a glasses apparatus having such a means or mechanism will be explained.

In the above-described exemplary embodiment described with reference to FIG. 23, a glasses apparatus may transmit an image which is polarized and output in the display apparatus 100 and to do so, may include the front polarizer 251, the liquid cell 252, the rear polarizer 253, and the input unit 254.

The front polarizer 251 has a polarization light in the same direction as the image polarized and output in the display apparatus 100 and transmits the image. For example, the display apparatus 100 may output an image which is polarized in a horizontal direction and in this case, the polarizer 251 transmits only an image which is polarized in a horizontal direction. However, if a glasses apparatus has the polarizer 251 which transmits only a polarized image in a vertical direction, the glasses apparatus may not transmit an image which is polarized in a horizontal direction. The front polarizer 251 blocks other ambient light having a different light axis except for an image which is intrinsically polarized in the display apparatus 100.

The liquid cell 252 is a component of which orientation is switched according to a driving voltage, and changes the characteristics of polarized light according to the switched orientation. The characteristics of polarized light may refer to the phase or direction of polarized light. That is, if polarized light enters and a specific driving voltage is applied to a liquid cell for orientation, the wavelength of the incident light may be delayed. For instance, the liquid cell may be an active retarder, and the polarization direction of a linearly-polarized image may be changed according to the specific applied voltage (phase change), or the direction of circular polarization may be reversed by changing the phase of the circular polarization. The characteristics of polarization may be changed appropriately to transmit incident light (left-eye or right-eye) by opening a glasses apparatus or to block incident light by closing the glasses apparatus. As an exemplary embodiment, if there is no voltage applied, linear light may be rotated by 90 degree (change phase difference as much as $\lambda/2$), and if a voltage is applied, the liner light may be transmitted without affecting the incident light.

Although the liquid cell is not technically limited in an exemplary embodiment, it may be realized as a TN electrically controllable birefringence (ECB) cell or a TN optically compensated bend (OCB) cell in an exemplary embodiment. If the liquid cell is realized as a twist TN cell and an applied voltage is '0,' the incident light is rotated and a polarization direction may be changed by 90 degree by the twisting of liquid molecules. That is, if the incident light is linearly polarized, the polarization direction is rotated by 90 degrees, if the incident light is left-circularly polarized, the polarization direction is changed to the right-circular polarized light, and the right-circular polarized light is changed to the left-circular polarized light.

The rear polarizer 253 is a component that re-polarizes an image which transmits a liquid cell, and transmits only a polarization element in a cross direction with respect to output polarized light of a display apparatus. Accordingly, after a glasses apparatus is opened, a polarized image of the display apparatus is to be in a state where the image can pass through the rear polarizer 253 through manipulation of a liquid cell. On the other hand, if a shutter glasses is closed, the liquid cell is to be converted such that the polarized output image of the display apparatus is perpendicular with respect to a polarization axis of the rear polarizer 253.

Referring to an operation of a glasses apparatus, if a shutter is opened, an image which is output from a display apparatus and polarized in a vertical direction passes through the front polarizer 251, and the liquid cell 252 transmits the image and makes the polarization direction consistent with the polarization axis of the rear polarizer 253. Accordingly, the image reaches human eyes through the glasses apparatus. On the other hand, if a shutter is closed, an image which is output from a display apparatus and polarized in a vertical direction passes through the front polarizer 251, and the liquid cell 252 also lets the image pass through. Accordingly, the polarization direction crosses at right angles and thus, the polarized image does not pass through the glasses apparatus and does not reach human eyes.

The input unit 254 is a component through which a user inputs a control command to control the liquid cell 252 of a glasses apparatus. That is, a user may change the polarization direction of a polarizing lens electrically by manipulating the input unit 254. The input unit 254 may include a button, a touch pad, a toggle button, etc., to change the polarization direction of a polarizing lens. For example, if a user who is watching content 2 through a glasses apparatus 200-11 presses a toggle button to change the polarization direction of a polarizing lens, the glasses apparatus 200-11 changes the polarization direction of the polarizing lens to a vertical direction and accordingly, the user may watch content 1.

The control unit 255 controls overall operations of the glasses apparatus 200'. In particular, the operation of the liquid cell 252 is controlled as described above according to an input of the input unit 254.

Herein, the glasses apparatuses 200-11, 200-12 may change the polarization direction of a left-eye lens and a right-eye lens respectively. If the polarization direction of a left-eye lens and a right-eye lens becomes different from each other as one of the polarization direction of the left-eye lens and the right-eye lens is changed, the glasses apparatus may be used to watch 3D contents.

In the case of a 3D display apparatus based on a polarization light method, a plurality of viewers watch the same content and thus, there is no need for communication between the display apparatus 100 and the glasses apparatus 200. However, if each of a plurality of viewers is watching different contents, the glasses apparatus 200 communicates with the display apparatus 100. For example, the glasses apparatuses 200-11, 200-12 may receive audio data corresponding to each content from the interface unit 160 of the display apparatus 100 and output the audio data through an audio output unit, or may transmit a control command input through the input unit 254 to the display apparatus 100. To do so, the glasses apparatuses 200-11, 200-12 may further include an interface unit (e.g., interface) which is connected to the display apparatus 100 to perform communication. As the interface unit in a glasses apparatus has already been explained above with respect to FIG. 6, further description will not be provided.

In the above-described exemplary embodiment, the polarization direction of a glasses apparatus is changed to change a content view. However, rather than changing the polarization direction of a polarizing lens in a glasses apparatus, the contents output from the display apparatus may be changed. For example, in FIG. 20, if a user who is watching content 1 through the glasses apparatus 200-11 having a polarizing lens in a horizontal direction wishes to watch content 2 by changing a content view, the display apparatus 100 may output content 2 in an area where content 1 used to be output once a command to change a content view is input through an input unit (e.g., inputter) in a remote controller 300 or in the glasses apparatus 200-11.

Meanwhile, if contents are watched using a glasses apparatus, there may be a mode for providing a plurality of contents and a mode for providing 3D contents. If the glasses apparatuses 200-11, 200-12 may change a polarization direction for each of the left-eye lens and the right-eye lens, the display apparatus 100 may display a message indicating that a user should change the polarization direction of one of the left-eye lens and the right-eye lens. The user wearing the glasses apparatus may change the polarization direction by manipulating the input unit 254.

If the glasses apparatus cannot change the polarization direction of each of the left-eye lens and the right-eye lens, a message indicating that a user should change the glasses apparatus may be displayed when a mode is changed.

Figure 24:
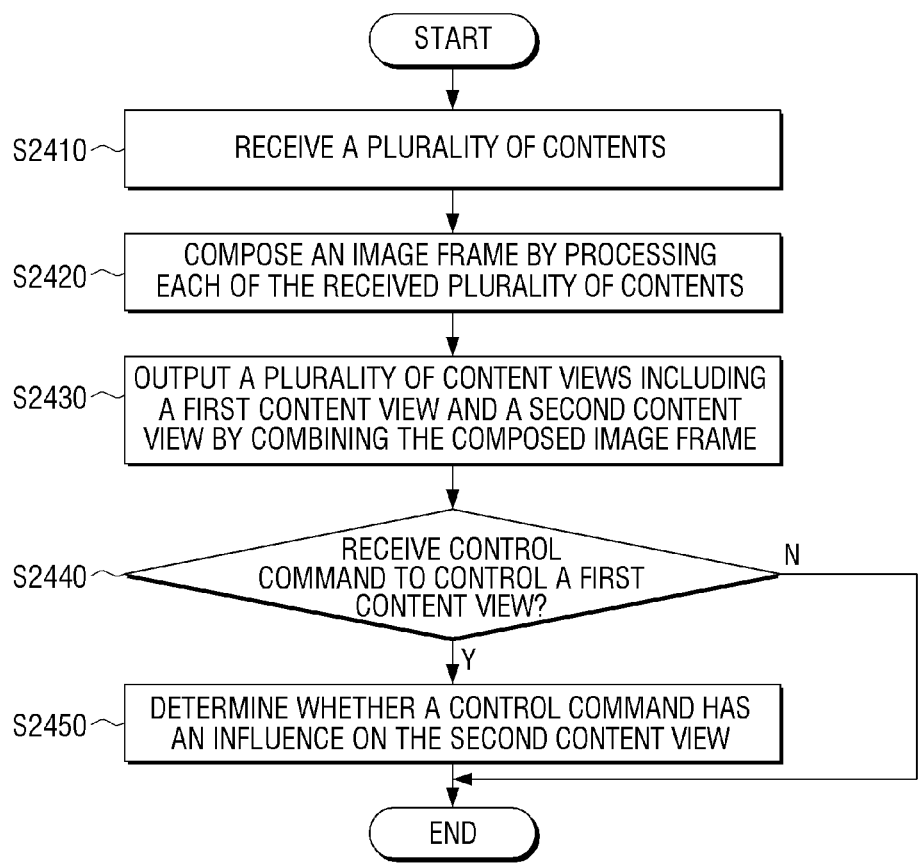
FIGS. 24-26 are flowcharts of display methods according to one or more exemplary embodiments.
Figure 25:
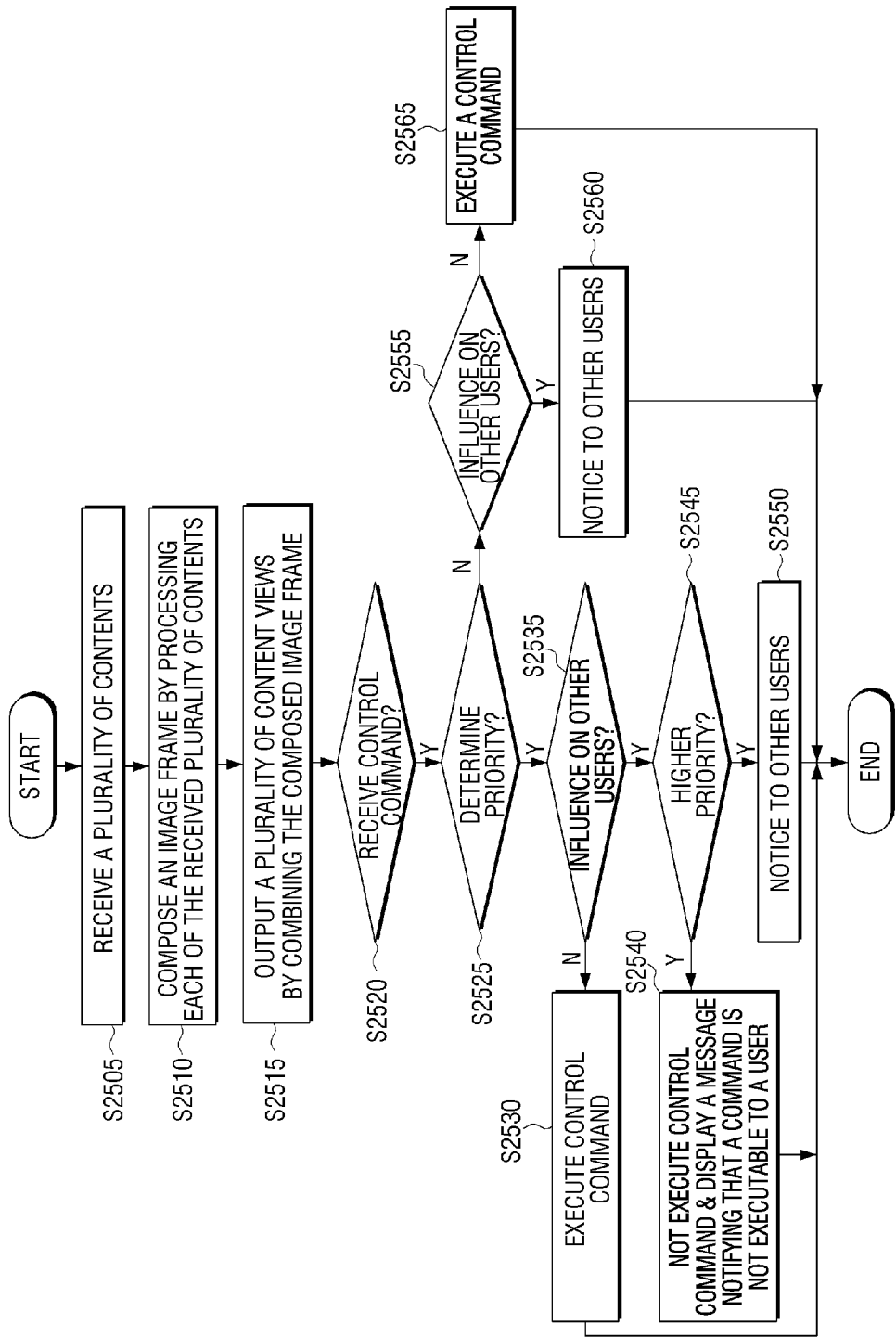
Figure 26:
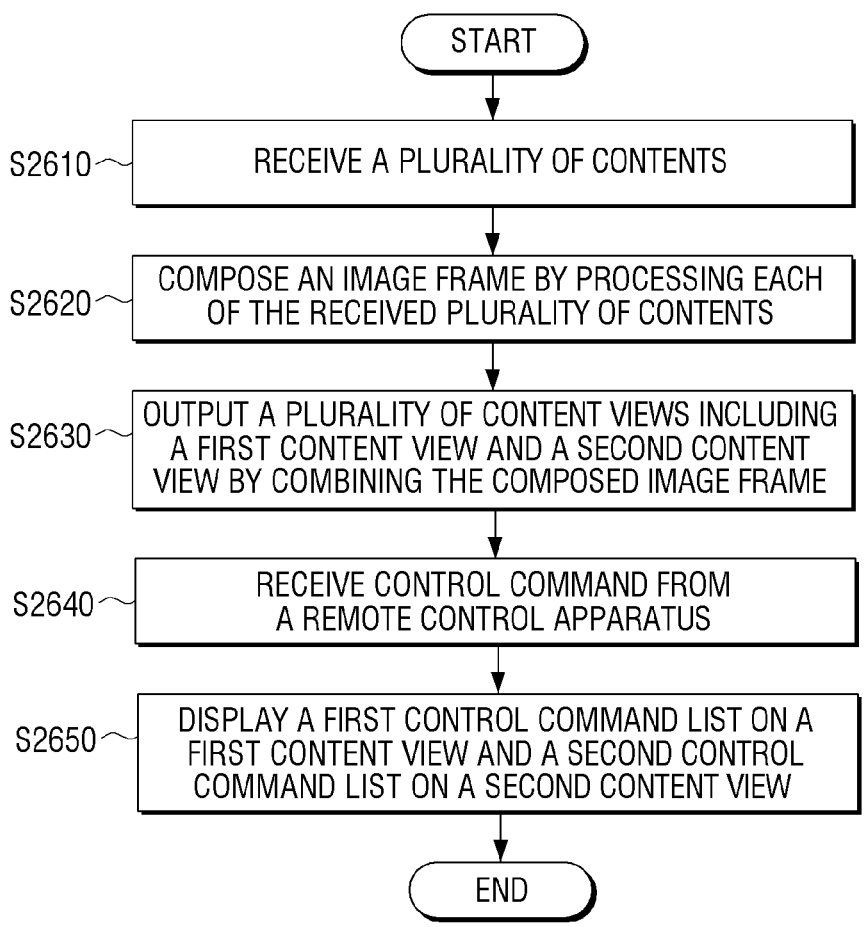

FIGS. 24 to 26 are flowcharts provided to illustrate display methods according to various exemplary embodiments.

Referring to FIG. 24, a display method according to an exemplary embodiment includes receiving a plurality of contents (operation S2410), obtaining image frames by processing the received plurality of contents (operation S2420), and outputting a plurality of content views including a first content view and a second content view by sequentially outputting the obtained image frames (e.g., outputting one or more image frames of the first content view alternately with one or more image frames of the second content view) (operation S2430). When a control command to control the first content view is received from a remote control apparatus (operation S2440-Y), the method further includes determining whether the received command is a control command that has an influence on the second content view (operation S2450).

The display method may further include, when the received control command is a control command that has an influence on the second content view, outputting a message in response to the received control command in at least one of the first content view and the second content view.

The display method may further include, when the received control command is a control command that has an influence on the second view, displaying a message notifying that the control command is not executable on the first content view.

The display method may further include, when the received control command is a control command that has no influence on the second content view, executing the control command.

The display method may further include, when the received control command is a control command that has an influence on the second content view, displaying a message asking whether to accept the control command execution on the second view, and when a signal (e.g., input) notifying agreement with the control command execution is received, executing the control command.

In this case, the displayed message can be at least one of a message notifying the control command input, a message asking whether to accept the control command execution, and a message notifying that the control command is not executable.

The displayed message can be output as at least one of an OSD type, a pop-up type, an icon type, a ticker type, a sound type, and a vibration type.

In addition, whether to receive a message in response to the received control command can be selectable on the second content view.

The display method may further include assigning priority on at least one of the first content view and the second content view.

In addition, the priorities may be assigned to content views according to an order of pairing the glasses apparatuses.

In addition, priorities may be assigned to content views based on a user's account information.

Furthermore, a highest priority may be assigned to a content view corresponding to a preset glasses apparatus.

The display method may further include, when the received control command is a control command that has an influence on the second view, and the second content view has a higher priority than the first content view, displaying a message asking whether to accept the control command execution on the second content view.

In addition, the displaying method may further include, when a signal accepting the control command execution is received, executing the control command.

In addition, the display method may further include, when the received control command is a control command that has an influence on the second content view, and the first content view has a higher priority than the second content view, displaying a message notifying the control command input on the second content view.

Also, the display method may further include, when the received control command is a control command that has an influence on the second content view, and the second content view has a higher priority than the first content view, displaying a message notifying that the control command is not executable on the first content view.

Referring to FIG. 25, a display method according to another exemplary embodiment, includes receiving a plurality of contents (operation S2505), obtaining image frames by processing the received plurality of contents (operation S2510), and outputting a plurality of content views by sequentially outputting the obtained image frames (operation S2515).

In this case, when a control command is received (operation S2520-Y) and a priority is determined (operation S2525-Y), it is determined whether or not the control command has any influence on other users' watching environment (operation S2535). When there is an influence on other users' watching environment (operation S2535-Y), it is determined whether or not a priority is higher compared with the other users (operation S2545). If it is determined that priority is higher than the other users (operation S2545-Y), a message notifying that the control command is input or a message requesting acceptance from other users is displayed. However, if there is no influence on the other users' watching environment (operation S2535-N), the control command is executed (operation S2530). Also, even if there is an influence on the watching environment of other users, if priority is lower than one or more other users, the control command is not executed, and a message notifying that the control command is not executable is displayed to a user (operation S2540).

Referring to FIG. 26, a display method according to still another exemplary embodiment includes receiving a plurality of contents (operation S2610), obtaining image frames by processing the received plurality of contents (operation S2620), and outputting a plurality of content views including a first content view and a second content view by sequentially outputting the obtained image frames (operation S2630). In addition, the method further includes receiving a control command from a remote control apparatus (operation S2640) and displaying a first control command list on the first content view and the second control command on the second content view (operation S2650).

At this time, the first command list and the second command list may be separately displayed.

In addition, the second control command list may include only control commands that have no influence on the first content view.

The second control command list can be a list that inactivates a control command that has an influence on the first content view (e.g., that includes the control command but inactivates or de-emphasizes the control command).

In addition, at least one of the first control command list and the second control command list can be set by a user of the first content view.

While the above-described exemplary embodiments relate to a display apparatus 100 including a display unit 130, it is understood that other exemplary embodiments are not limited thereto. For example, other exemplary embodiments may be applicable to an image processing apparatus such as a set-top box, a stand-alone control device, an audio/video receiver, an optical media player, an image source, etc. Furthermore, it is understood that in exemplary embodiments, one or more units of the above-described apparatuses 100, 200, 300 can include a processor or microprocessor executing a computer program stored in a computer-readable medium.

Although a few exemplary embodiments have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A display apparatus, comprising:
a receiver configured to receive a plurality of contents;
a signal processor configured to obtain image frames by processing the received plurality of contents;
a display configured to output a plurality of content views including a first content view and a second content view by sequentially outputting the obtained image frames;
a remote control signal receiver configured to receive a control command from a remote control apparatus; and
a controller configured to, when the received control command is to control the first content view, determine whether the received control command is a control command that has an influence on the second content view,
wherein the received control command comprises identification information based on a first glasses apparatus matching with the first content view, from among a plurality of glasses apparatuses for viewing the plurality of content views.

2. The display apparatus as claimed in claim 1, wherein the controller, when the received control command is the control command that has the influence on the second content view, controls to output a message in response to the received control command on at least one of the first content view and the second content view.

3. The display apparatus as claimed in claim 1, wherein the controller, when the received control command is the control command that has the influence on the second content view, controls to display, on the first content view, a message notifying that the control command is not executable.

4. The apparatus as claimed in claim 1, wherein the controller, when the received control command is a control command that has no influence on the second content view, executes the received control command.

5. The apparatus as claimed in claim 1, wherein the controller, when the received control command is the control command that has the influence on the second content view, controls to display, on the second content view, a message requesting acceptance of an execution of the received control command, and when a signal accepting the execution of the received control command is received, executes the received control command.

6. The apparatus as claimed in claim 2, wherein the message is at least one of a message notifying an input of the received control command, a message requesting acceptance of an execution of the received control command, and a message notifying that the received control command is not executable.

7. The apparatus as claimed in claim 2, wherein the message is output as at least one of an on-screen display (OSD) type, a pop-up type, an icon type, a ticker type, a sound type, and a vibration type.

8. The apparatus as claimed in claim 2, wherein whether to receive the message in response to the received control command is selectable on the second content view.

9. The apparatus as claimed in claim 1, wherein the controller assigns priority to at least one of the first content view and the second content view.

10. A display apparatus, comprising:
a receiver configured to receive a plurality of contents;
a signal processor configured to obtain image frames by processing the received plurality of contents;
a display configured to output a plurality of content views including a first content view and a second content view by sequentially outputting the obtained image frames;
a remote control signal receiver configured to receive a control command from a remote control apparatus; and
a controller configured to, when the received control command is to control the first content view, determine whether the received control command is a control command that has an influence on the second content view,
wherein the controller assigns priority to at least one of the first content view and the second content view, and
wherein the controller assigns a highest priority to a content view corresponding to a glasses apparatus paired first.

11. The apparatus as claimed in claim 9, wherein the controller determines a priority of a content view corresponding to a user based on an account information of the user.

12. The apparatus as claimed in claim 9, wherein the controller assigns a priority to a content view according to a preset glasses apparatus.

13. The apparatus as claimed in claim 9, wherein the controller, when the received control command is the control command that has the influence on the second content view, and the second content view has a higher priority than the first content view, controls to display, on the second content view, a message requesting acceptance of an execution of the received control command.

14. The apparatus as claimed in claim 13, wherein the controller, when a signal accepting the execution of the received control command execution is received, executes the received control command.

15. The apparatus as claimed in claim 9, wherein the controller, when the received control command is the control command that has the influence on the second content view, and the first content view has a higher priority than the second content view, controls to display, on the second content view, a message notifying an input of the received control command.

16. The apparatus as claimed in claim 9, wherein the controller, when the received control command is the control command that has the influence on the second content view, and the second content view has a higher priority than the first content view, controls to display, on the first content view, a message notifying that the received control command is not executable.

17. A display apparatus, comprising:
a receiver configured to receive a plurality of contents;
a signal processor configured to obtain image frames by processing the received plurality of contents;
a display configured to output a plurality of content views including a first content view and a second content view by sequentially outputting the obtained image frames;
a remote control signal receiver configured to receive a control command from a remote control apparatus; and
a controller configured to output via the display a first control command list on the first content view and a second control command list on the second content view, wherein the second control command list is a list in which a control command that has an influence on the first content view is inactivated.

18. The apparatus as claimed in claim 17, wherein the controller controls to separately display the first control command list and the second control command list.

19. The apparatus as claimed in claim 17, wherein the second control command list is a list of control commands that have no influence on the first content view.

20. The apparatus as claimed in claim 17, wherein at least one of the first control command list and the second control command list is settable by a user of the first content view.

21. A display method, comprising:
receiving a plurality of contents;
obtaining image frames by processing the received plurality of contents;
outputting a plurality of content views including a first content view and a second content view by sequentially outputting the obtained image frames;
receiving a control command from a remote control apparatus; and
when the received control command is to control the first content view, determining whether the received control command is a control command that has an influence on the second content view,
wherein the received control command comprises identification information based on a first glasses apparatus matching with the first content view, from among a plurality of glasses apparatuses for viewing the plurality of content views.

22. The method as claimed in claim 21, further comprising:
when the received control command is the control command that has the influence on the second content view, outputting a message in response to the received control command at least one of the first content view and the second content view.

23. The method as claimed in claim 21, further comprising:
when the received control command is the control command that has the influence on the second view, displaying, on the first content view, a message notifying that the control command is not executable.

24. The method as claimed in claim 21, further comprising:
when the received control command is a control command that has no influence on the second content view, executing the received control command.

25. The method as claimed in claim 21, further comprising:
when the received control command is the control command that has the influence on the second content view, displaying, on the second content view, a message requesting acceptance of an execution of the received control command, and when a signal accepting the execution of the received control command is received, executing the received control command.

26. The method as claimed in claim 22, wherein the message is at least one of a message notifying an input of the received control command, a message requesting acceptance of an execution of the received control command, and a message notifying that the received control command is not executable.

27. The method as claimed in claim 22, wherein the message is output as at least one of an OSD type, a pop-up type, an icon type, a ticker type, a sound type, and a vibration type.

28. The method as claimed in claim 22, wherein whether to receive the message in response to the received control command is selectable on the second content view.

29. The method as claimed in claim 21, further comprising: assigning priority on at least one of the first content view and the second content view.

30. A display method, comprising:
receiving a plurality of contents;
obtaining image frames by processing the received plurality of contents;
outputting a plurality of content views including a first content view and a second content view by sequentially outputting the obtained image frames;
receiving a control command from a remote control apparatus; and
when the received control command is to control the first content view, determining whether the received control command is a control command that has an influence on the second content view,
wherein the method further comprises assigning priority on at least one of the first content view and the second content view, and
wherein the assigning the priority comprises assigning a highest priority on a content view corresponding to a glasses apparatus paired first.

31. The method as claimed in claim 29,
wherein the assigning the priority comprises determining a priority of a content view corresponding to a user based on an account information of the user.

32. The method as claimed in claim 29,
wherein the assigning the priority comprises assigning a priority on a content view according to a preset glasses apparatus.

33. The method as claimed in claim 29, further comprising:
when the received control command is the control command that has the influence on the second content view, and the second content view has a higher priority than the first content view, displaying, on the second content view, a message requesting acceptance of an execution of the received control command.

34. The method as claimed in claim 33, further comprising:
when a signal accepting the execution of the received control command execution is received, executing the received control command.

35. The method as claimed in claim 29, further comprising:
when the received control command is the control command that has the influence on the second content view, and the first content view has a higher priority than the second content view, displaying, on the second content view, a message notifying an input of the received control command.

36. The method as claimed in claim 29, further comprising:
when the received control command is the control command that has the influence on the second content view, and the second content view has a higher priority than the first content view, displaying, on the first content view, a message notifying that the received control command is not executable.

37. A display method, comprising:
receiving a plurality of contents;
obtaining image frames by processing the received plurality of contents;
outputting a plurality of content views including a first content view and a second content view by sequentially outputting the obtained image frames;
receiving a control command from a remote control apparatus; and
outputting a first control command list on the first content view and a second control command list on the second content view, wherein the second control command list is a list in which a control command that has an influence on the first content view is inactivated.

38. The method as claimed in claim 37, wherein the first control command list and the second control command list are separately displayed.

39. The method as claimed in claim 37, wherein the second control command list is a list of control commands that have no influence on the first content view.

40. The method as claimed in claim 37, wherein at least one of the first control command list and the second control command list is settable by a user of the first content view.

41. A non-transitory computer readable recording medium having recorded thereon a program executable by a computer for performing a display method, the display method comprising:
receiving a plurality of contents;
obtaining image frames by processing the received plurality of contents;
outputting a plurality of content views including a first content view and a second content view by sequentially outputting the obtained image frames;
receiving a control command from a remote control apparatus; and
when the received control command is to control the first content view, determining whether the received control command is a control command that has an influence on the second content view,
wherein the received control command comprises identification information based on a first glasses apparatus matching with the first content view, from among a plurality of glasses apparatuses for viewing the plurality of content views.

42. A non-transitory computer readable recording medium having recorded thereon a program executable by a computer for performing a display method, the display method comprising:
receiving a plurality of contents;
obtaining image frames by processing the received plurality of contents;
outputting a plurality of content views including a first content view and a second content view by sequentially outputting the obtained image frames;
receiving a control command from a remote control apparatus; and
outputting a first control command list on the first content view and a second control command list on the second content view, wherein the second control command list is a list in which a control command that has an influence on the first content view is inactivated.

* * * * *